(12) United States Patent
Masuzawa et al.

(10) Patent No.: US 8,298,651 B2
(45) Date of Patent: Oct. 30, 2012

(54) HOLLOW STRUCTURE FORMING SUBSTRATE, METHOD OF PRODUCING HOLLOW STRUCTURE FORMING SUBSTRATE, AND METHOD OF PRODUCING HOLLOW STRUCTURE USING HOLLOW STRUCTURE FORMING SUBSTRATE

(75) Inventors: Masahiro Masuzawa, Chiba (JP); Masaru Ohgaki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 494 days.

(21) Appl. No.: 12/518,981

(22) PCT Filed: Jan. 10, 2008

(86) PCT No.: PCT/JP2008/050560
§ 371 (c)(1),
(2), (4) Date: Jun. 12, 2009

(87) PCT Pub. No.: WO2008/093543
PCT Pub. Date: Aug. 7, 2008

(65) Prior Publication Data
US 2010/0035040 A1  Feb. 11, 2010

(30) Foreign Application Priority Data

Jan. 29, 2007 (JP) .................. 2007-017716

(51) Int. Cl.
*B32B 1/00* (2006.01)
*B32B 3/12* (2006.01)
*B32B 3/00* (2006.01)

(52) U.S. Cl. ........................ 428/166; 428/178

(58) Field of Classification Search .................... 428/69, 428/72, 73, 178, 166, 116, 118
See application file for complete search history.

(56) References Cited

U.S. PATENT DOCUMENTS

| 3,765,810 A | 10/1973 | Smarook |
| 6,613,172 B1 | 9/2003 | Tsujimoto et al. |
| 2006/0134829 A1 | 6/2006 | Rosa et al. |

FOREIGN PATENT DOCUMENTS

EP    1 027 977    8/2000
(Continued)

OTHER PUBLICATIONS

Extended European Search Report issued on Jun. 25, 2012 in the counterpart Japanese application PCT/JP2008/050560, filed on Oct. 10, 2008.

*Primary Examiner* — Catherine A Simone
(74) *Attorney, Agent, or Firm* — Oblon, Spivak, McClelland, Maier & Neustadt, L.L.P.

(57) ABSTRACT

A hollow structure forming substrate includes: a surface on which a plastic-deformation film is formed by using a plastic-deformable material; a plurality of regularly-arranged gas-retaining spaces; a plurality of gas leading-out parts each having a first opening which faces corresponding one of the gas-retaining spaces and a second opening which faces the surface, the gas leading-out parts leads out gas retained in the gas-retaining spaces toward the surface under depressurized environmental condition; and a plurality of infiltration preventing spaces each provided in a space between corresponding one of the first openings and corresponding one of the second openings, in which the infiltration preventing spaces prevent infiltration of the plastic-deformable material from the surface into the gas-retaining spaces.

13 Claims, 23 Drawing Sheets

FOREIGN PATENT DOCUMENTS

| | | |
|---|---|---|
| JP | 8 108440 | 4/1996 |
| JP | 8 112873 | 5/1996 |
| JP | 10 80964 | 3/1998 |
| JP | 10 323909 | 12/1998 |
| JP | 2001-315217 | 11/2001 |
| JP | 2006 145767 | 6/2006 |
| WO | 2007 029864 | 3/2007 |
| WO | WO 2007029864 A1 * | 3/2007 |

* cited by examiner

HOLLOW STRUCTURE FORMING SUBSTRATE, METHOD OF PRODUCING HOLLOW STRUCTURE FORMING SUBSTRATE, AND METHOD OF PRODUCING HOLLOW STRUCTURE USING HOLLOW STRUCTURE FORMING SUBSTRATE

TECHNICAL FIELD

The present invention relates to a substrate for forming a hollow structure suitable for forming the hollow structure having regularly-arranged hollow parts. The invention also relates to a method of producing the hollow structure forming substrate, and to a method of producing the hollow structure using the hollow structure forming substrate.

BACKGROUND ART

There has been known a hollow structure, such as the structure disclosed in Japanese patent publication No. H08-112873 for example. Japanese patent publication No. H08-112873 discloses a foamed hollow structure, in which a highly expandable thermoplastic resin composition is filled into each square-shaped hollow recess of a thermoplastic resin body having a lattice-like horizontal sectional configuration. The thermoplastic resin body is then heated to cause volume expansion of the highly expandable thermoplastic resin composition, so as to obtain the foamed hollow structure.

Recently, a technology of producing a hollow structure having a plurality of regularly-arranged hollow parts is being developed. The hollow structure having the regularly-arranged hollow parts is formed by regularly forming gas-retaining spaces, which stores gas therein, to a substrate, and forming a flat plastic-deformation film, which includes a plastic-deformable material, on a surface of the substrate. Then, the plastic-deformation film is expanded and extended by expanding pressure of the gas inside of the gas-retaining spaces, so as to obtain the hollow structure having the regularly-arranged hollow parts. Such a technology is, for example, described in Japanese patent publication No. 2007-98930.

DISCLOSURE OF THE INVENTION

Referring to FIG. 1A, the technology described in Japanese patent publication No. 2007-98930 forms and regularly arranges recesses 2, in which inner wall surfaces thereof are substantially spherical, in a hollow structure forming substrate 1 as the gas-retaining spaces, and forms circular openings 3, which communicate with the atmosphere, on the recesses 2. Each of the openings 3 is used as a gas leading-out part, which leads air inside the recess 2 toward outside therefrom.

More specifically, the hollow structure is manufactured through processes described below, in the technology described in Japanese publication No. 2007-98930.

Referring to FIG. 1B, first, a thin plastic-deformation film 4, which includes a plastic-deformable material, is formed on a surface 1a of the substrate 1 in such a manner as to block the openings 3. The plastic-deformation film 4 may be formed by, for example, a spin coating method, a slit coating method, or the like.

Then, the hollow structure forming substrate 1, formed with the plastic-deformation film 4 illustrated in FIG. 1B, is set inside a vacuum container 125. Inside of the vacuum container is depressurized to 1 KPa-50 Kpa (a pressure of $\frac{1}{100}$ atmospheres to $\frac{1}{2}$ atmospheres), before the plastic-deformation film 4 hardens.

The air inside of each of the recesses 2 expands due to the depressurization of the inside of the vacuum container, and is thereby lead out from the opening 3 toward the plastic-deformation film 4. Referring to FIG. 1C, each portion of the plastic-deformation film 4 corresponding to the opening 3 is expanded and extended by expanding pressure of the air existing in the recess 2. Thereby, the plastic-deformation film 4 is deformed to a structure having a plurality of hollow parts 5a.

A liquid component within the plastic-deformable material, structuring the structure having the hollow parts 5a, vaporizes under the depressurized environmental condition. As a result, an expanded body is hardened to form the hollow structure 5 having the plurality of hollow parts 5a. FIG. 1D illustrates the hollow structure 5 detached from the hollow structure forming substrate 1.

Referring to FIG. 1B, however, there may be a possibility, in the technology described in Japanese patent publication No. 2007-98930, that a part of the plastic-deformable material infiltrates from the opening 3 into the recess 2, by which the recess 2 in which the part of the plastic-deformable material is infiltrated and the recess 2 without the infiltration of the part of the plastic-deformable material are generated. Since an amount of air or gas sealed differs in the recess 2 with the infiltration and in the recess 2 without the infiltration, the expanding pressure of the gas under the depressurized environmental condition also becomes different. Consequently, there are likely that variation in the volume of the hollow parts 5a is generated, and that film-thickness of partition walls 5b dividing the respective hollow parts 5a, and also film-thickness of surface layer films 5c become uneven.

In order to avoid the infiltration of the plastic-deformable material into the recesses 2, a size of each of the openings 3 may be set small. However, thickness of an opening peripheral wall part 3a structuring the opening 3 becomes thinner as the size of the opening 3 is set smaller. Hence, the strength of the opening peripheral wall part 3a becomes weaker.

Accordingly, there may be a possibility that a crack, breaking or the like in parts of the opening peripheral wall parts 3a is generated while the hollow structure forming substrate 1 is used to form the hollow structure 5 many times, thereby reducing use-efficiency of the hollow structure forming substrate 1.

At least one objective of the present invention is to provide a hollow structure forming substrate, a method of producing the hollow structure forming substrate, and a method of producing a hollow structure using the hollow structure forming substrate, capable of increasing strength of an opening peripheral wall part which structures an opening that leads out gas stored in a gas-retaining space toward outside of the gas-retaining space, and capable of uniformizing volume of respective hollow parts and uniformizing film-thickness of parts partitioning the respective hollow parts of the hollow structure.

To achieve these and other advantages and in accordance with the purpose of the invention, as embodied and broadly described herein, the invention provides a hollow structure forming substrate, comprising: a surface on which a plastic-deformation film is formed by using a plastic-deformable material; a plurality of regularly-arranged gas-retaining spaces each retaining gas therein; a plurality of gas leading-out parts each having a first opening which faces corresponding one of the gas-retaining spaces and a second opening which faces the surface, the gas leading-out parts leading out the gas retained in the gas-retaining spaces toward the surface under depressurized environmental condition; and a plurality of infiltration preventing spaces each provided in a space between corresponding one of the first openings and corresponding one of the second openings, the infiltration preventing spaces preventing infiltration of the plastic-deformable material from the surface into the gas-retaining spaces, wherein the plastic-deformation film is deformed and expanded on the surface by expanding pressure of the gas led-out from the gas-retaining spaces to the gas leading-out parts through the infiltration preventing spaces so as to form a hollow structure having regularly-arranged hollow parts.

Advantageously, each of the gas leading-out parts includes a cylindrical opening, and wherein each of the gas-retaining spaces includes a cylindrical recess or a quadrangular cylindrical recess.

Advantageously, each of the gas leading-out parts includes a cylindrical opening, and wherein each of the gas-retaining spaces includes a hexagonal cylindrical recess.

Advantageously, the gas-retaining spaces forms a hexagonal close-packed structure.

Advantageously, the surface includes hexagonal annular contour parts having the cylindrical openings in the center thereof, respectively.

Advantageously, each of the annular contour parts includes an annular projection.

Advantageously, the surface surrounded by each of the annular contour parts is processed with a water-repellent process, and wherein each of the annular contour parts has a hydrophilic property.

Advantageously, each of the annular contour parts includes a titanium metal film.

Advantageously, a diameter of each of the cylindrical openings is between 5 µm and 90 µm, preferably between 5 µm and 50 µm, and most preferably between 5 µm and 30 µm.

Advantageously, each of the gas leading-out parts has volume which is possible to ignore volume of each of the gas-retaining spaces.

Advantageously, the hollow structure forming substrate further comprises: a plurality of recesses each having a circular-arc configuration in cross-section, and each including corresponding one of the cylindrical openings in a central bottom part thereof; and a plurality of partition walls partitioning each of the adjoining circular-arc recesses, and each having a hexagonal configuration.

In addition, the invention also provides a method of producing a hollow structure forming substrate, the method comprising: forming a resist thin-film on one surface of a metal substrate; forming cylindrical exposed portions, which correspond to cylindrical openings, by exposing the resist thin-film according to a regular pattern and by removing unexposed portions of the resist thin-film from the one surface; forming a metal thin-film having regularly-arranged cylindrical recesses, which correspond to the cylindrical openings, and on which a plastic-deformation film is formed, by forming a metal thin-film on the one surface, in which the cylindrical exposed portions are used as a mask, and by removing the cylindrical exposed portions; forming a resist thick-film on one surface of the metal thin-film in such a manner as to bury the cylindrical recesses; forming polygonal cylindrical exposed portions by exposing the resist thick-film according to a regular pattern and by removing unexposed portions of the resist-thick film from the one surface of the metal thin-film, wherein the unexposed portions of the resist-thick film correspond to partition wall forming recesses for forming partition walls of regularly-arranged gas-retaining spaces, and wherein the gas-retaining spaces having the cylindrical openings in the center thereof, respectively; forming a metal thick-film in the partition wall forming recesses, in such a manner that the metal thick-film is integrated with the metal thin-film and that the polygonal cylindrical exposed portions are not buried thereby; detaching a structure, which includes the metal thin-film, the metal thick-film and the polygonal cylindrical exposed portions, from the metal substrate; and forming the hollow structure forming substrate by removing the polygonal cylindrical exposed portions, wherein the hollow structure forming substrate includes a surface on which the plastic-deformation film is formed, the regularly-arranged gas-retaining spaces each retaining gas therein, and a plurality of gas leading-out parts each having a first opening which faces corresponding one of the gas-retaining spaces and a second opening which faces the surface, and the gas leading-out parts lead out the gas retained in the gas-retaining spaces toward the surface under depressurized environmental condition.

Advantageously, the method further comprises: forming hexagonal annular grooves on the one surface of the metal substrate before the resist thin-film is formed on the one surface of the metal substrate, wherein the hexagonal annular grooves form regularly-arranged hexagonal annular projections having the cylindrical openings in the center thereof, respectively.

Advantageously, the method further comprises: forming a hydrophilic titanium film on the surface; and forming a water-repellent film on the surface excluding the hydrophilic titanium film.

Moreover, the invention provides a method of producing a hollow structure, the method comprising: preparing a hollow structure forming substrate, including: a surface on which a plastic-deformation film is formed by using a plastic-deformable material; a plurality of regularly-arranged gas-retaining spaces each retaining gas therein; a plurality of gas leading-out parts each having a first opening which faces corresponding one of the gas-retaining spaces and a second opening which faces the surface, the gas leading-out parts leading out the gas retained in the gas-retaining spaces toward the surface under depressurized environmental condition; and a plurality of infiltration preventing spaces each provided in a space between corresponding one of the first openings and corresponding one of the second openings, the infiltration preventing spaces preventing infiltration of the plastic-deformable material from the surface into the gas-retaining spaces; forming the plastic-deformation film by coating the plastic-deformable material on the surface of the hollow structure forming substrate; setting the hollow structure forming substrate, on which the plastic-deformation film is formed, under the depressurized environmental condition; and forming the hollow structure having regularly-arranged hollow parts by expanding the gas retained in each of the gas retaining spaces so as to deform and expand the plastic-deformation film with expanding pressure of the gas.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this description. The drawings illustrate embodiments of the invention and, together with the description, serve to explain the principles of the invention.

DESCRIPTION OF NUMERALS

Figure 1A:
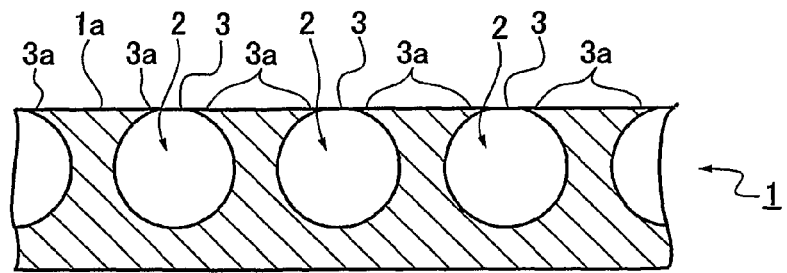
FIG. 1A is a vertical-sectional explanatory view illustrating a method of producing a hollow structure by using a conventional hollow structure forming substrate, in which the conventional hollow structure forming substrate is illustrated.
Figure 1B:
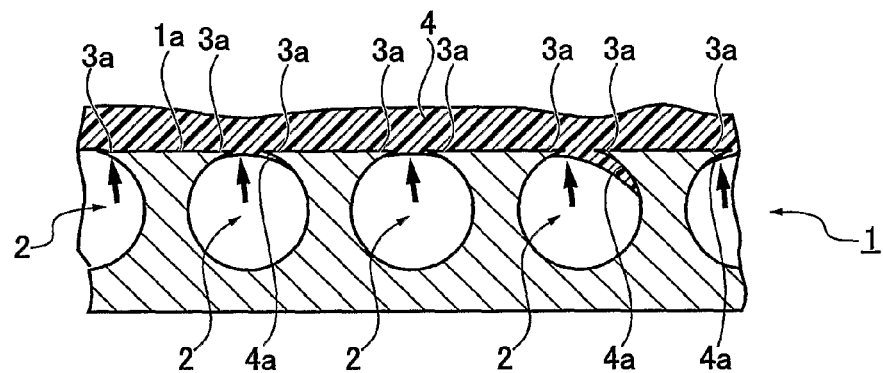
FIG. 1B is a vertical-sectional explanatory view illustrating the method of producing the hollow structure by using the conventional hollow structure forming substrate, in which a state that a plastic-deformation film is formed on a surface of the hollow structure forming substrate illustrated in FIG. 1A is illustrated.
Figure 1C:
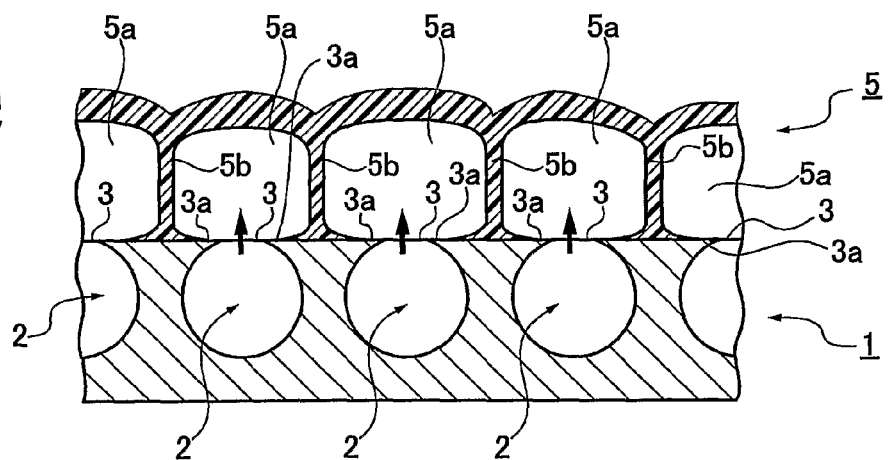
FIG. 1C is a vertical-sectional explanatory view illustrating the method of producing the hollow structure by using the conventional hollow structure forming substrate, in which a state that the hollow structure is formed by expanding gas in recesses under the depressurized condition is illustrated.
Figure 1D:
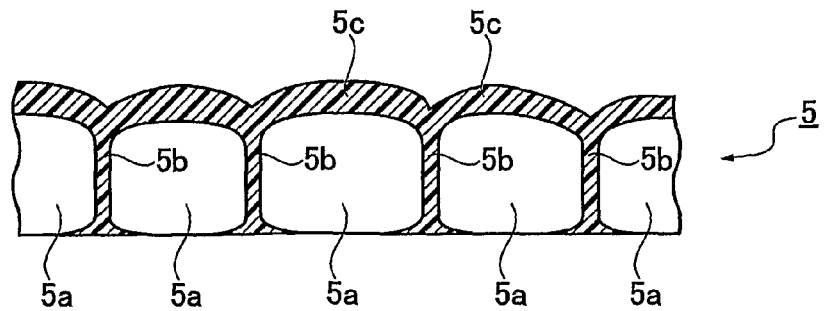
FIG. 1D is a vertical-sectional explanatory view illustrating the method of producing the hollow structure by using the conventional hollow structure forming substrate, in which the hollow structure formed is illustrated.

21 Quadrangular cylindrical recess (gas-retaining space)
22 Cylindrical opening (gas leading-out part)
22a, 22b Openings
22c Infiltration preventing space
23 Hollow structure forming substrate
23" Surface
4 Plastic-deformation film

BEST MODE FOR CARRYING OUT THE INVENTION

Reference will now be made in detail to the present preferred embodiments of the present invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

FIG. 2A to FIG. 2J illustrate a method of producing a hollow structure forming substrate according to a first embodiment of the present invention.

Figure 2A:
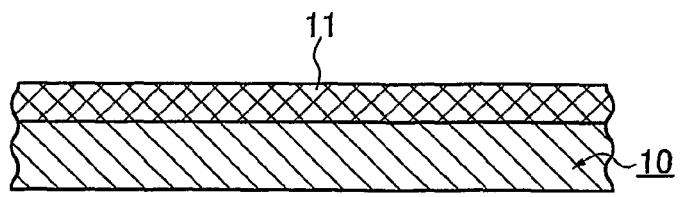
FIG. 2A is a cross-sectional explanatory view illustrating a method of producing a hollow structure forming substrate according to a first embodiment of the present invention, in which a state that a resist film is formed on a metal substrate is illustrated.

Referring to FIG. 2A, first, a resist thin-film 11 is formed on a metal substrate 10 all over the one surface of the metal substrate 10, preferably through a spin coating method. The metal substrate 10 preferably includes a nickel material, and a film-thickness of the resist thin-film 11 is preferably from about 20 μm to about 30 μm. In the present embodiment, "SU-8" available from MicroChem Corporation is used for a resist, although it is not limited thereto.

Figure 2B:
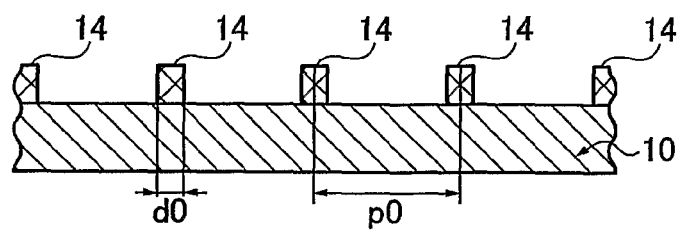
FIG. 2B is a cross-sectional explanatory view illustrating the method of producing the hollow structure forming substrate according to the first embodiment of the present invention, in which the metal substrate formed with cylindrical resist bodies is illustrated.
Figure 3:
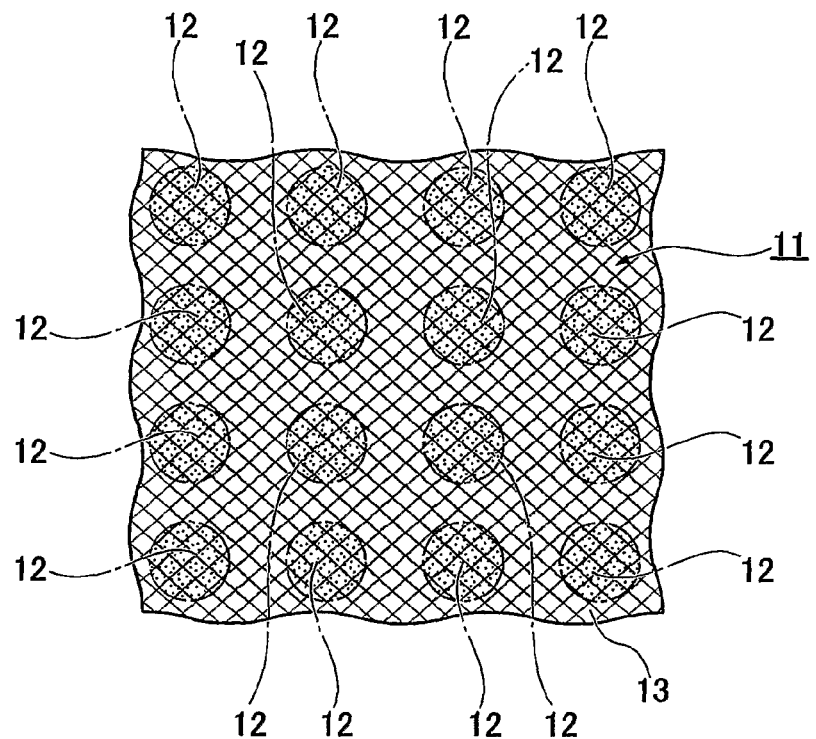
FIG. 3 is a plan view illustrating a state in which circular regions of the resist film illustrated in FIG. 2A are subjected to exposure.

Then, referring to FIG. 3, circular regions 12, arranged in a square lattice-like configuration, are subjected to exposure, and unexposed portions 13 of the resist thin-film 11 are removed by a development process. Thereby, as illustrated in FIG. 2B, cylindrical resist bodies 14 as cylindrical exposed portions, which are arranged regularly on the metal substrate 10, are formed on the metal substrate 10. In the present embodiment, the cylindrical resist bodies 14 are aligned in a square lattice-like configuration. A diameter dO of each of the cylindrical resist bodies 14 is preferably about 15 μm, and a pitch pO between the adjacent cylindrical resist bodies 14 is preferably about 150 μm. The cylindrical resist body 14 becomes or corresponds to an inside diameter of a cylindrical opening as a gas leading-out part, which will be described later in detail.

Figure 2C:
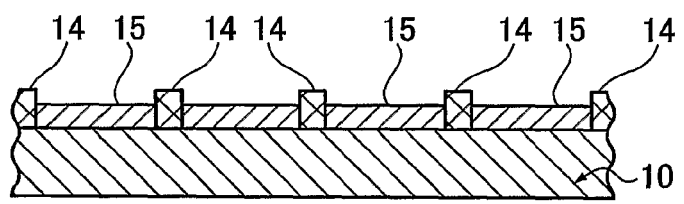
FIG. 2C is a cross-sectional explanatory view illustrating the method of producing the hollow structure forming substrate according to the first embodiment of the present invention, in which the metal substrate formed with a nickel electroforming film is illustrated.

Next, as illustrated in FIG. 2C, a nickel electroforming film 15 as a metal thin-film for example is formed through a nickel electroforming method, in which the cylindrical resist bodies 14 are used as a mask. A film-thickness of the nickel electroforming film 15 is preferably set to the extent that cylindrical resist bodies 14 are not buried by the nickel electroforming film 15 through the nickel electroforming. In the present embodiment, the film-thickness of the nickel electroforming film 15 is set at about 15 μm, although it is not limited thereto.

Figure 2D:
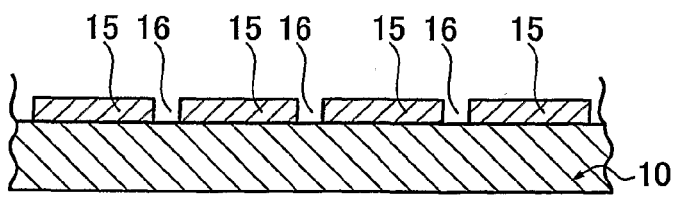
FIG. 2D is a cross-sectional explanatory view illustrating the method of producing the hollow structure forming substrate according to the first embodiment of the present invention, in which the metal substrate formed with cylindrical recesses is illustrated.

Next, the metal substrate 10 is washed, and thereafter, the cylindrical resist bodies 14 are removed. Thereby, as illustrated in FIG. 2D, the metal substrate 10 in which regularly-arranged cylindrical recesses 16, which correspond to the cylindrical openings, are formed on the nickel electroforming film 15, is obtained.

Figure 2E:
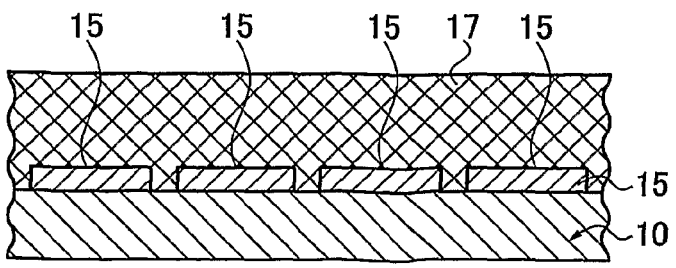
FIG. 2E is a cross-sectional explanatory view illustrating the method of producing the hollow structure forming substrate according to the first embodiment of the present invention, in which the metal substrate formed with a resist film, formed in such a manner as to fill in the cylindrical recesses of the nickel electroforming film, is illustrated.
Figure 4:
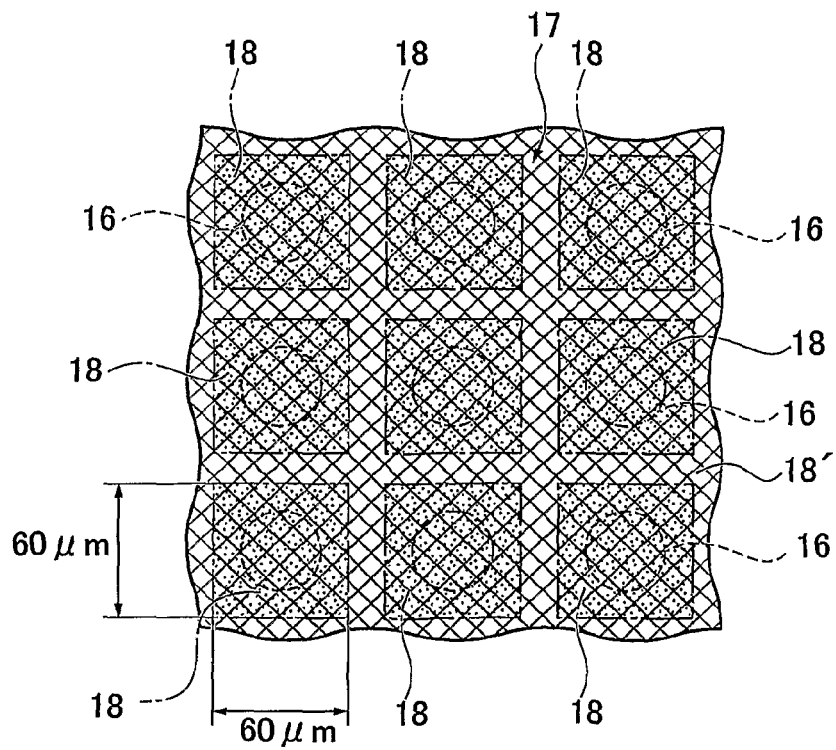
FIG. 4 is a plan view illustrating a state in which quadrangular regions of the resist film illustrated in FIG. 2E are subjected to exposure.

Then, as illustrated in FIG. 2E, a resist thick-film 17 is formed in such a manner as to bury the cylindrical recesses 16. In the present embodiment, a film-thickness of the resist thick-film 17 is preferably from about 50 μm to about 60 μm. Subsequently, as illustrated in FIG. 4, regularly-arranged quadrangular regions 18 are exposed. The quadrangular regions 18 become or correspond to quadrangular cylindrical exposed portions for forming later-described quadrangular cylindrical recesses, and portions of the resist thick-film 17 excluding the quadrangular regions 18 become or correspond to unexposed portions 18' for forming later-described lattice-like grooves.

An intersecting point of diagonal lines of the quadrangular region 18 and the center of the cylindrical resist body 14 are set to coincide with each other. In the present embodiment, a length of a side of the quadrangular region 18 is about 60 μm, although it is not limited thereto.

Figure 2F:
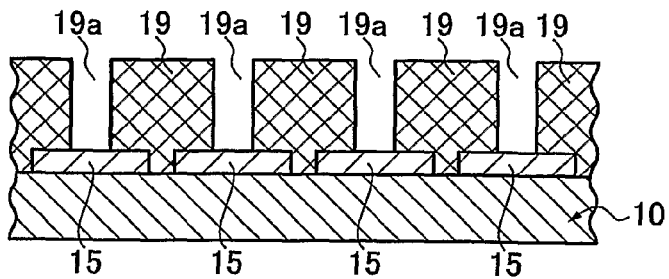
FIG. 2F is a cross-sectional explanatory view illustrating the method of producing the hollow structure forming substrate according to the first embodiment of the present invention, in which the metal substrate, wherein quadrangular cylindrical resist bodies and lattice-like grooves are formed, is illustrated.

Then, the unexposed portions 18' of the resist thick-film 17 are removed by a development process. Thereby, as illustrated in FIG. 2F, regularly-arranged quadrangular cylindrical resist bodies 19 are formed. A space between the quadrangular cylindrical resist bodies becomes or corresponds to the lattice-like groove 19a as a recess for forming a partition wall of a gas-retaining space.

Figure 2G:
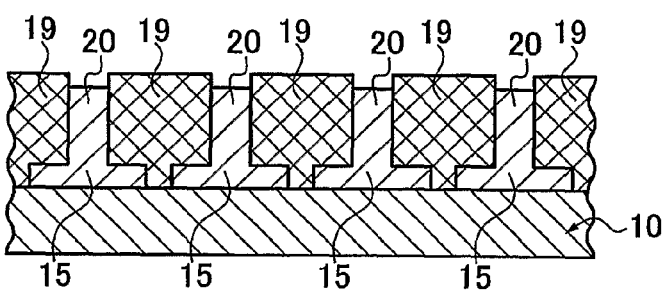
FIG. 2G is a cross-sectional explanatory view illustrating the method of producing the hollow structure forming substrate according to the first embodiment of the present invention, in which the metal substrate, wherein a nickel electroforming film is formed in the lattice-like grooves, is illustrated.

Subsequently, as illustrated in FIG. 2G, by using the quadrangular cylindrical resist bodies 19 as a mask, a nickel electroforming film 20 as a metal thick-film for example is formed in the lattice-like grooves 19a through a nickel electroforming method. A film-thickness of the nickel electroforming film 20 is set to the extent that the quadrangular cylindrical resist bodies 19 are not buried by the nickel electroforming film 20 through the nickel electroforming. In the present embodiment, the film-thickness of the nickel electroforming film 20 is set at about 40 μm, although it is not limited thereto. It is to be noted that the nickel electroforming film 20 is integrated with the nickel electroforming film 15.

Figure 2H:
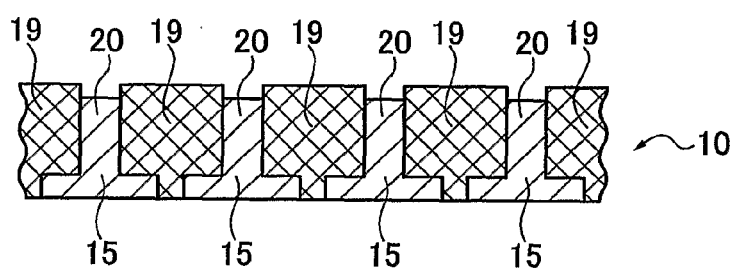
FIG. 2H is a cross-sectional explanatory view illustrating the method of producing the hollow structure forming substrate according to the first embodiment of the present invention, in which a state that a structure, including the nickel electroforming film and the quadrangular cylindrical resist bodies, is separated from the metal substrate is illustrated.

Next, as illustrated in FIG. 2H, a structure including the nickel electroforming film 20, the nickel electroforming film 15, and the quadrangular cylindrical resist bodies 19 is detached from the metal substrate 10 by a suitable known method.

Figure 2I:
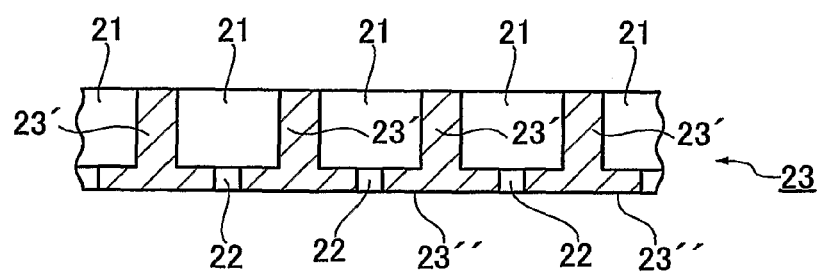
FIG. 2I is a cross-sectional explanatory view illustrating the method of producing the hollow structure forming substrate according to the first embodiment of the present invention, in which the metal substrate, wherein the quadrangular cylindrical resist bodies are removed, is illustrated.
Figure 2J:
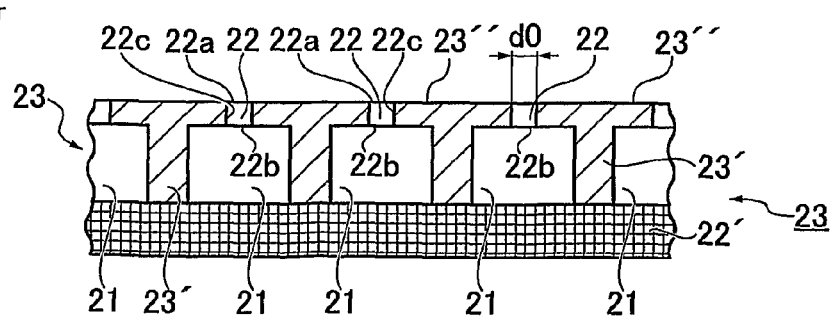
FIG. 2J is a cross-sectional explanatory view illustrating the method of producing the hollow structure forming substrate according to the first embodiment of the present invention, in which the hollow structure forming substrate, with an adhesive sheet attached to a back surface thereof, as a finished product is illustrated.

Subsequently, the quadrangular cylindrical resist bodies 19 are removed. Thereby, the hollow structure forming substrate 23 illustrated in FIG. 2I is obtained. The hollow structure forming substrate 23 thus obtained has the quadrangular cylindrical recesses 21 and the cylindrical openings 22.

Figure 5A:
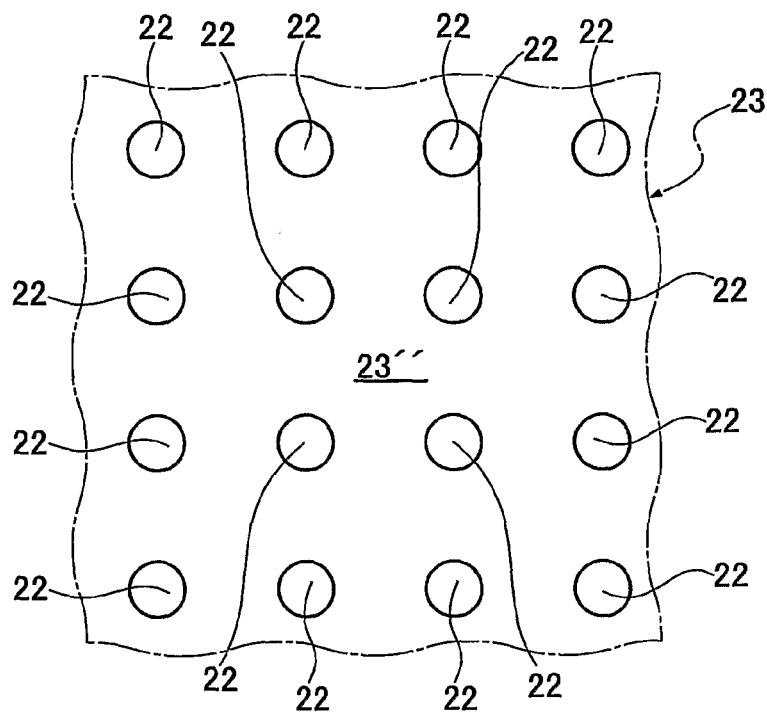
FIG. 5A is an explanatory plan view illustrating a configuration of the hollow structure forming substrate according to the first embodiment, in which a state that the hollow structure forming substrate illustrated in FIG. 2I is seen from a front surface thereof is illustrated.
Figure 5B:
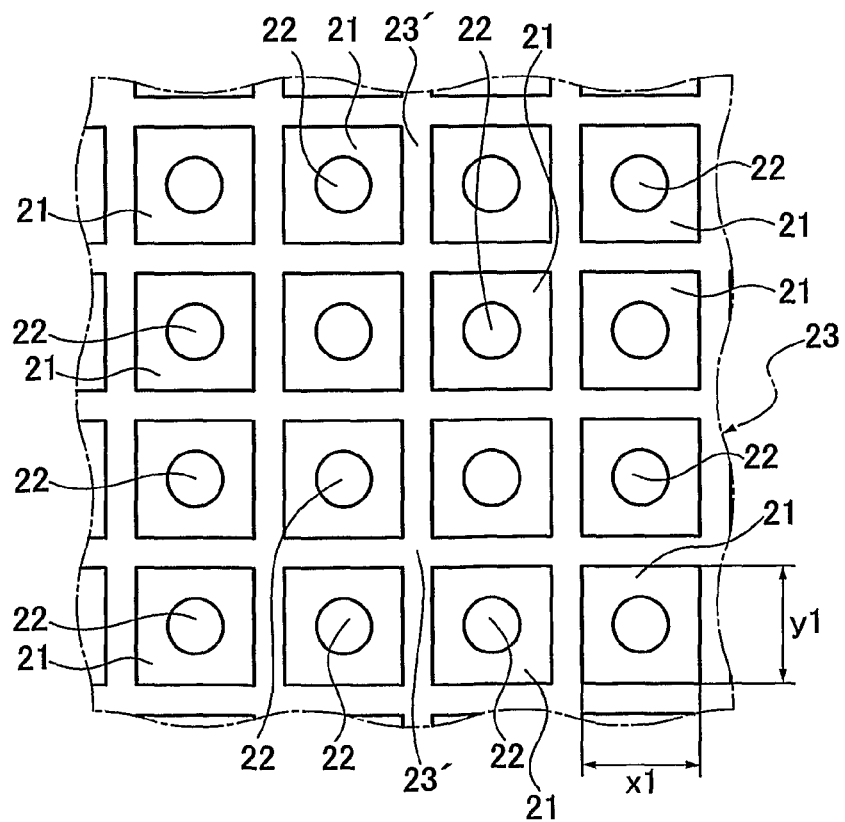
FIG. 5B is an explanatory plan view illustrating a configuration of the hollow structure forming substrate according to the first embodiment, in which a state that the hollow structure forming substrate illustrated in FIG. 2I is seen from the back surface thereof is illustrated.

As illustrated in FIG. 5A, the hollow structure forming substrate 23 is formed with the cylindrical openings 22 each of which is formed on a side of a front surface of the hollow structure forming substrate 23 at a predetermined pitch. In addition, as illustrated in FIG. 5B, each the quadrangular cylindrical recesses 21, which are surrounded by lattice-like partition walls 23', is formed on a side of a back surface of the hollow structure forming substrate 23 at a predetermined pitch. A back surface of the nickel electroforming film 20 is sealed by, for example but not limited to, an adhesive sheet 22'.

Each of the quadrangular cylindrical recesses 21 functions as the gas-retaining space for retaining gas or air, whereas each of the cylindrical openings 22 function as the gas leading-out part which leads out the gas retained inside of the quadrangular cylindrical recess 21 toward outside of the quadrangular cylindrical recess 21.

The cylindrical opening 22 has an opening 22a which is open toward the quadrangular cylindrical recess 21, and an opening 22b which is open toward the surface of the hollow structure forming substrate 23. A space between the opening 22a and the opening 22b becomes or corresponds to an infiltration preventing space 22c which blocks or intercepts infiltration of a later-described plastic-deformable material into the quadrangular cylindrical recess 21. As will be described later in detail, the surface 23" of the hollow structure forming substrate 23 is formed with a plastic-deformation film.

Now, a method of forming or producing a hollow structure by using the hollow structure forming substrate 23 will be described with reference to FIG. 6.

Figure 6:
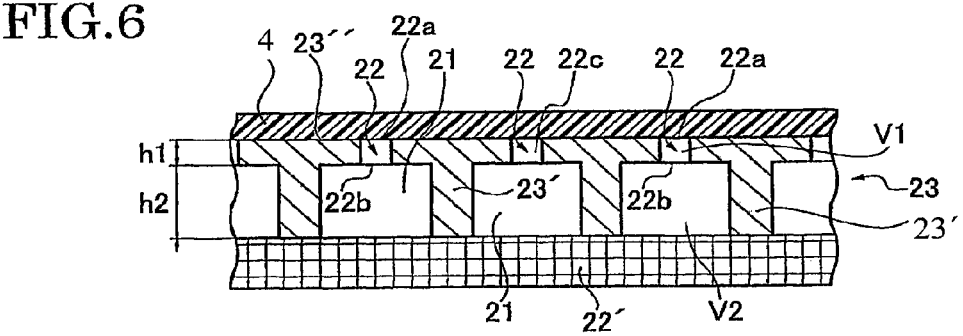
FIG. 6 is a cross-sectional view illustrating a state in which a plastic-deformation film is formed on the surface of the hollow structure forming substrate illustrated in FIG. 2J.

Referring to FIG. 6, first, the plastic-deformable material is used to form the plastic-deformation film 4 on the surface 23" of the hollow structure forming substrate 23. The plastic-deformable material includes a water-soluble ultraviolet curing resin having a surfactant. Also, a water-soluble resin can be used for the plastic-deformable material. The water-soluble resin may includes, for example, polyurethane, gelatin, polyvinyl alcohol, or other suitable water-soluble resins. In addition, the formation of the plastic-deformation film 4 utilizes a film-forming device, such as a spin-coater, a slit-coater, or other suitable devices.

When the plastic-deformation film 4 is formed, a part of the plastic-deformable material tries to infiltrate from the cylindrical opening 22 toward the quadrangular cylindrical recess 21. However, since the diameter dO of the opening 22a and the opening 22b is small, i.e., about 30 μm in the present embodiment, and also since the infiltration preventing space 22c is present between the opening 22a and the 22b, the infiltration of the material into the quadrangular cylindrical recess 21 is prevented.

The volume $V_1$ of the infiltration preventing space 22c can be defined as follows.

$$V_1 = \pi h_1 \times dO^2/4$$

where $h_1$ is a length of the infiltration preventing space 22c.

In addition, the volume $V_2$ of the quadrangular cylindrical recess 21 can be defined as follows.

$$V_2 = h_2 x_1 \times y_1$$

where $h_2$ is a depth of the quadrangular cylindrical recess 21, and $x_1$ and $y_1$ are length of respective sides of the quadrangular cylindrical recess 21.

Therefore, even when the plastic-deformable material has entered the infiltration preventing space 22c, it is possible to ignore a difference in expanding pressure caused by a variation in an amount of expansion of the gas in each of the quadrangular cylindrical recesses 21, since the volume $V_2$ is larger than the volume $V_1$ to the extent that the volume $V_2$ can ignore the volume $V_1$.

It is to be noted that the infiltration of the plastic-deformable material into the quadrangular cylindrical recess 21 is difficult to occur when the diameter dO of the opening 22a and the opening 22b is equal to or less than 30 μm, in accordance with the present embodiment of the invention. This is supported by a following experiment.

The experiment was performed by, first, preparing the plural hollow structure forming substrates 23 in which the diameters of the openings 22a and 22b are 10 μm, 30 μm, 50 μm, 70 μm, and 90 μm, respectively. In addition, a liquid material as the water-soluble ultraviolet curing resin having the surfactant, in which fluorine-based surfactant of "Novec (Registered Trademark) FC-4430" available from 3M Company was added to alkoxyacrylate of "PEG400DA" available from Daicel-Cytec Company, Ltd., was used for the plastic-deformable material. Also, a liquid material as the water-soluble ultraviolet curing resin having the surfactant, in which the fluorine-based surfactant of "Novec (Registered Trademark) FC-4430" available from 3M Company was added to epoxy acrylate of "AQ9" available from Arakawa Chemical Industries, Ltd., was used for the plastic-deformable material.

These plastic-deformable materials were coated with a spin-coating method on the hollow structure forming substrates 23 including the openings 22a and 22b having the diameter dO, to form the plastic-deformation films 4.

The infiltration of the liquid materials into the quadrangular cylindrical recesses 21 was not found for the hollow structure forming substrates 23 including the openings 22a and 22b having the diameters dO of equal to or less than 50 μm, when the liquid materials described above were used for the plastic-deformable material.

Next, a liquid material including "Hydran (Registered Trademark) WLS-201", available from Dainippon Ink and Chemicals Incorporated, as the polyurethane was prepared for the water-soluble resin. Also, a powder material including "MC-243", available from Jellice Co., Ltd., as the gelatin was prepared for the water-soluble resin. Moreover, as the polyvinyl alcohol, a powder material including "Poval (Registered Trademark) PVA117", available from Kuraray Co., Ltd., was prepared for the water-soluble resin. The gelatin and the polyvinyl alcohol are dissolved by adding water with a proportion in which a lower limit of viscosity, capable of forming a film by a spin-coating method, is obtained, respectively.

These water-soluble resins were used as the plastic-deformable materials to be coated with a spin-coating method on the hollow structure forming substrates 23, including the openings 22a and 22b having the diameter dO, so as to form the plastic-deformation films 4.

In the case of the polyurethane, the infiltration of the liquid material into the quadrangular cylindrical recesses 21 was not found for the hollow structure forming substrates 23 including the openings 22a and 22b having the diameters dO of equal to or less than 70 μm.

In the cases of the plastic-deformable materials utilizing the gelatin and the polyvinyl alcohol having the lower limit of the viscosity in which the formation of the film is possible, the infiltration of the liquid materials into the quadrangular cylindrical recesses 21 was not found for the hollow structure forming substrates 23 including the openings 22a and 22b having the diameters dO of equal to or less than 30 μm, respectively.

In addition, in the cases of the plastic-deformable materials utilizing the gelatin and the polyvinyl alcohol having high viscosity required for the formation of the hollow structure having a desired film-thickness, the infiltration of the liquid materials into the quadrangular cylindrical recesses 21 was not found for the hollow structure forming substrates 23 including the openings 22a and 22b having the diameters dO of equal to or less than 90 μm, respectively.

From the results of the experiment described above, it can be considered that the hollow structure forming substrate 23, in which the diameter dO of the openings 22a and 22b is equal to or less than 30 μm, is possible to ensure prevention of the infiltration of the plastic-deformable material into the quadrangular cylindrical recesses 21, in prospect of safety.

This consideration is based on a view that an influence of surface tension of the plastic-deformation material becomes more dominant than an influence of gravity in the opening 22a in which the diameter dO thereof is equal to or less than 30 μm. Meanwhile, it is preferable that the diameter dO of the openings 22a and 22b be equal to or more than 5 μm, in consideration of velocity of ejection of the gas.

In the present first embodiment of the invention, a liquid material including "Hydran (Registered Trademark) WLS-201", available from Dainippon Ink and Chemicals Incorporated, as the polyurethane is coated on the surface 23" of the hollow structure forming substrate 23. The hollow structure forming substrate 23 on which the liquid material is coated is then set in the spin-coater device. In the present embodiment, the hollow structure forming substrate 23 is rotated in the spin-coater device, for example, for 10 seconds with the number of rotations of 1200 rpm, although it is not limited thereto, so as to form the plastic-deformation film 4 on the surface 23" of the hollow structure forming substrate 23.

Figure 7A:
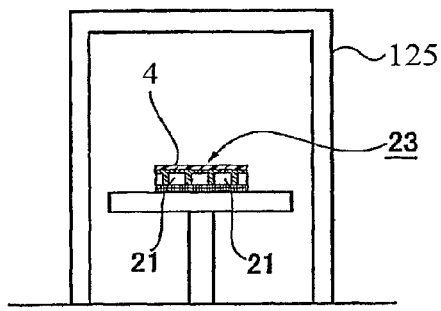
FIG. 7A is an explanatory view for producing a hollow structure by using the hollow structure forming substrate formed with the plastic-deformation film illustrated in FIG. 6, in which a state that the hollow structure forming substrate is set in a vacuum container is illustrated.

Referring to FIG. 7A, then, the hollow structure forming substrate 23, formed with the plastic-deformation film 4, is set in a vacuum container 125, and internal pressure of the vacuum container 125 is depressurized to about 100 Kpa (1 atmosphere) to about 2 KPa, for example.

Figure 7B:
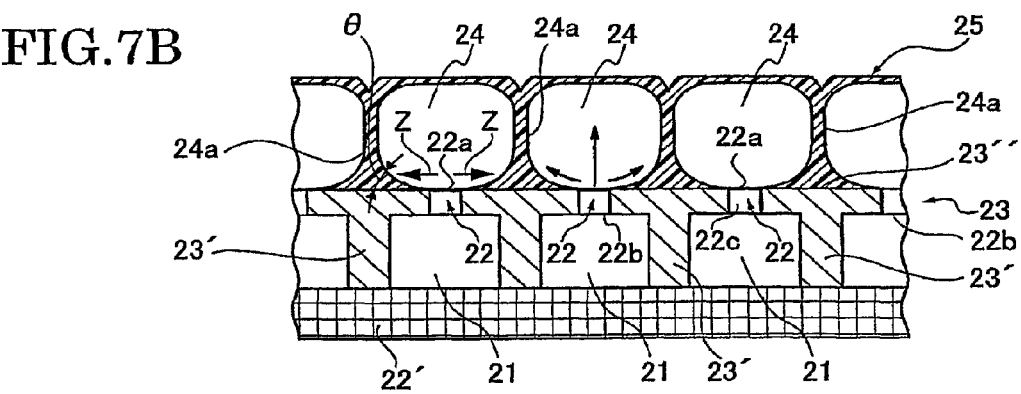
FIG. 7B is a vertical-sectional explanatory view for producing the hollow structure by using the hollow structure forming substrate formed with the plastic-deformation film illustrated in FIG. 6, in which a process of expansion and extension of the plastic-deformation film illustrated in FIG. 7A is illustrated.

Thereby, the air or the gas in each of the quadrangular cylindrical recesses 21 expands by about 50 times, and thus the plastic-deformation film 4 expands and extends by the expanding pressure of the gas, as illustrated in FIG. 7B.

Hence, the hollow structure 25 having the regular hollow parts 24 (or cells) is formed. A shape of each of the hollow parts 24 becomes substantially uniform mutually, since an amount of air retained in each of the quadrangular cylindrical recesses 21 is substantially equal mutually. Therefore, the hollow structure 25 having the uniform hollow parts 24 is obtained.

Figure 7C:
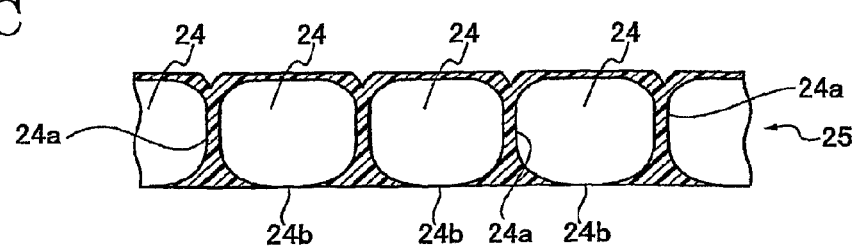
FIG. 7C is a vertical-sectional explanatory view for producing the hollow structure by using the hollow structure forming substrate formed with the plastic-deformation film illustrated in FIG. 6, in which the hollow structure produced through the process illustrated in FIG. 7B is illustrated.

Referring to FIG. 7C, the hollow structure 25 thus obtained is detached from the hollow structure forming substrate 23. The hollow structure 25 is utilized, for example but limited to, for an electrophoretic display in which a solvent, wherein charged coloring matter particles or charged coloring particles are dispersed, is filled in the hollow parts 24.

In the present first embodiment, the hollow structure 25, in which a length of a side of the hollow part 24 is about 130 µm, in which a depth of the hollow part 24 is about 60 µm, in which a wall-thickness of a partition wall 24a of the hollow part 24 (or the cell) is about 10 µm, and in which an opening diameter of an opening 24b of the hollow part 24 is about 30 µm to about 40 µm, for example, is obtained.

According to the hollow structure forming substrate 23 of the present first embodiment, since each of the cylindrical openings 22 has the predetermined thickness, deterioration, damage and so forth of the hollow structure forming substrate 23, in particular the cylindrical openings 22, are small even when the hollow structure forming substrate 23 is repeatedly used.

Now, a second embodiment of the present invention will be described with reference to FIGS. 8A to 8M. Note that elements or parts of the present embodiment same as or similar to those described in the above embodiment are attached with the same reference numbers, and explanation thereto will not be given in detail, for the sake of convenience of explanation.

Figure 8A:
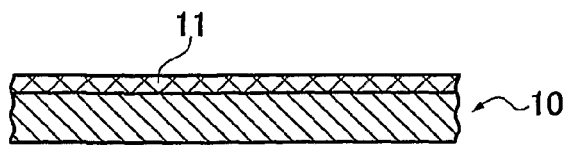
FIG. 8A is a cross-sectional explanatory view illustrating a method of producing a hollow structure forming substrate according to a second embodiment of the present invention, in which a state that a resist film is formed on a metal substrate is illustrated.

Referring to FIG. 8A, first, the resist thin-film 11 is formed on the metal substrate 10, preferably through the spin coating method. In the present embodiment, the metal substrate 10 includes a copper material, and the film-thickness of the resist film 11 is about 1 µm, for example. In the present embodiment, "TSMR-8900" available from Tokyo Ohka Kogyo Co., Ltd., is used for a resist, although it is not limited thereto.

Figure 8B:
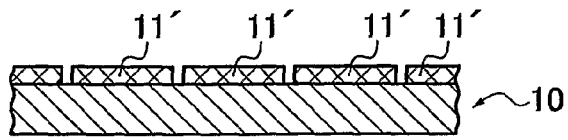
FIG. 8B is a cross-sectional explanatory view illustrating the method of producing the hollow structure forming substrate according to the second embodiment of the present invention, in which the metal substrate formed with the resist films having a cubic close-packed structure is illustrated.
Figure 9:
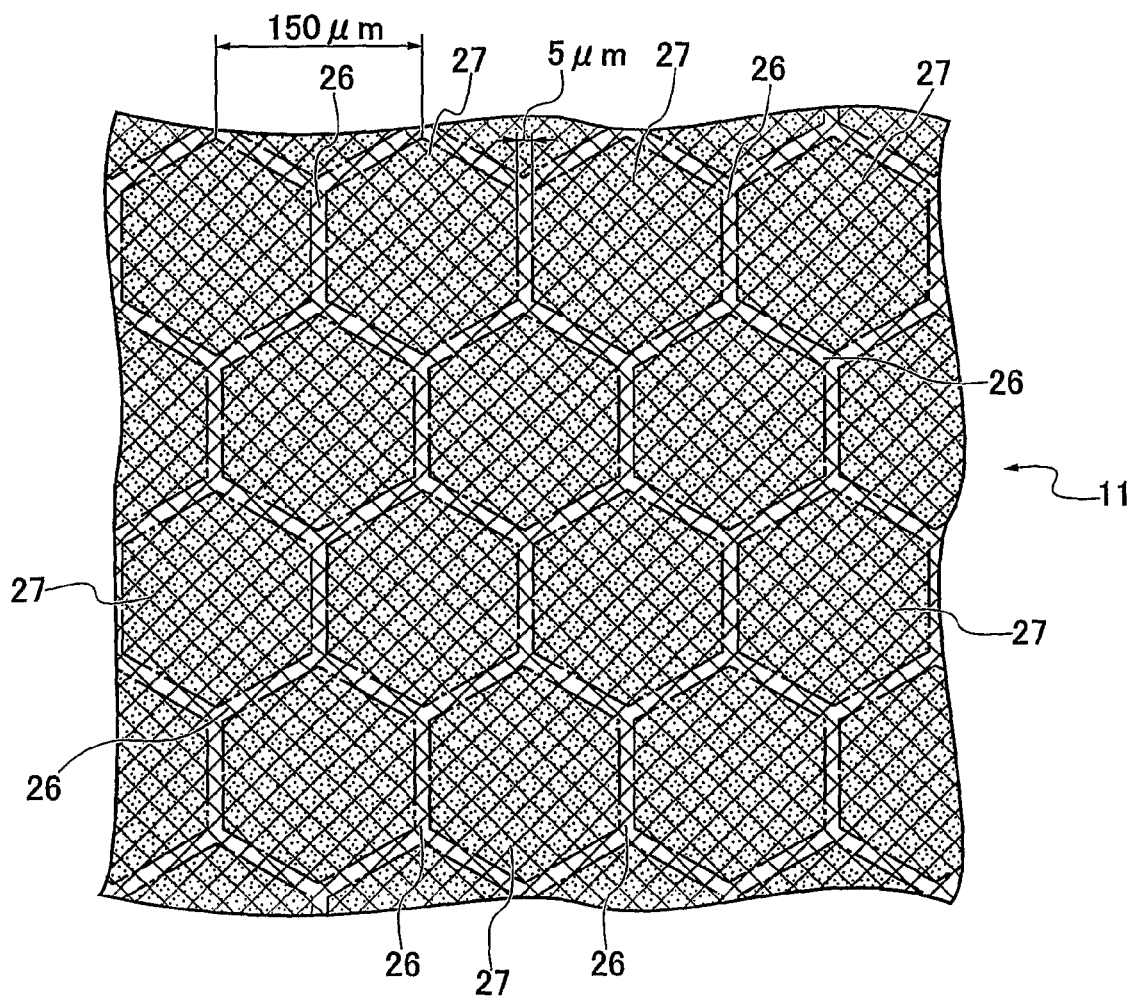
FIG. 9 is a plan view illustrating a state in which hexagonal regions of the resist film illustrated in FIG. 8A are subjected to exposure.

Then, referring to FIG. 9, regularly-arranged hexagonal regions 27 are exposed, and the resist film 11, in which unexposed portions 26 present rim parts, is subjected to a development process to remove the unexposed portions 26. Thereby, as illustrated in FIG. 8B, resist films 11', which are arranged to be a hexagonal close-packed structure, are formed. In the present embodiment, a width of the unexposed portion 26 (or the rim part) is about 5 µm, and a distance between the centers of the mutually adjacent hexagonal regions 27 is about 150 µm, for example.

Figure 8C:
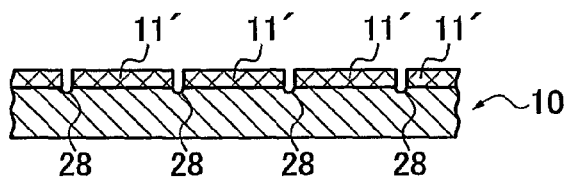
FIG. 8C is a cross-sectional explanatory view illustrating the method of producing the hollow structure forming substrate according to the second embodiment of the present invention, in which the metal substrate formed with annular grooves is illustrated.

Then, as illustrated in FIG. 8C, an etching process, in which the resist films 11' of a cubic close-packed structure are used as a mask, is performed to form hexagonal annular grooves 28 which correspond to shapes of the rim parts. A depth of the groove 28 is about 5 µm, for example. The grooves 28 are used for forming annular projections as hexagonal annular contour parts which will be described later in detail.

Figure 8D:
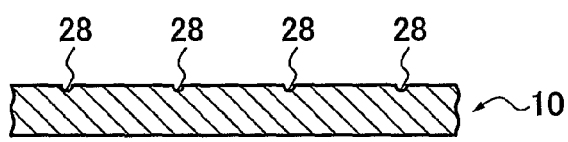
FIG. 8D is a cross-sectional explanatory view illustrating the method of producing the hollow structure forming substrate according to the second embodiment of the present invention, in which the metal substrate, wherein the resist films illustrated in FIG. 8C are removed, is illustrated.

Thereafter, as illustrated in FIG. 8D, the resist films 11' of the cubic close-packed structure are removed to obtain the metal substrate 10 having the grooves 28 of a honeycomb structure.

Figure 8E:
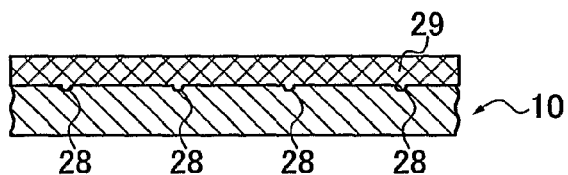
FIG. 8E is a cross-sectional explanatory view illustrating the method of producing the hollow structure forming substrate according to the second embodiment of the present invention, in which a state that the metal substrate illustrated in FIG. 8D is formed with a resist film is illustrated.

Next, as illustrated in FIG. 8E, a resist thin-film 29 is formed, preferably through a spin coating method. In the present embodiment, a film-thickness of the resist thin-film 29 is preferably from about 20 µm to about 30 µm, and "SU-8" available from MicroChem Corporation is used for a resist, although it is not limited thereto.

Figure 10:
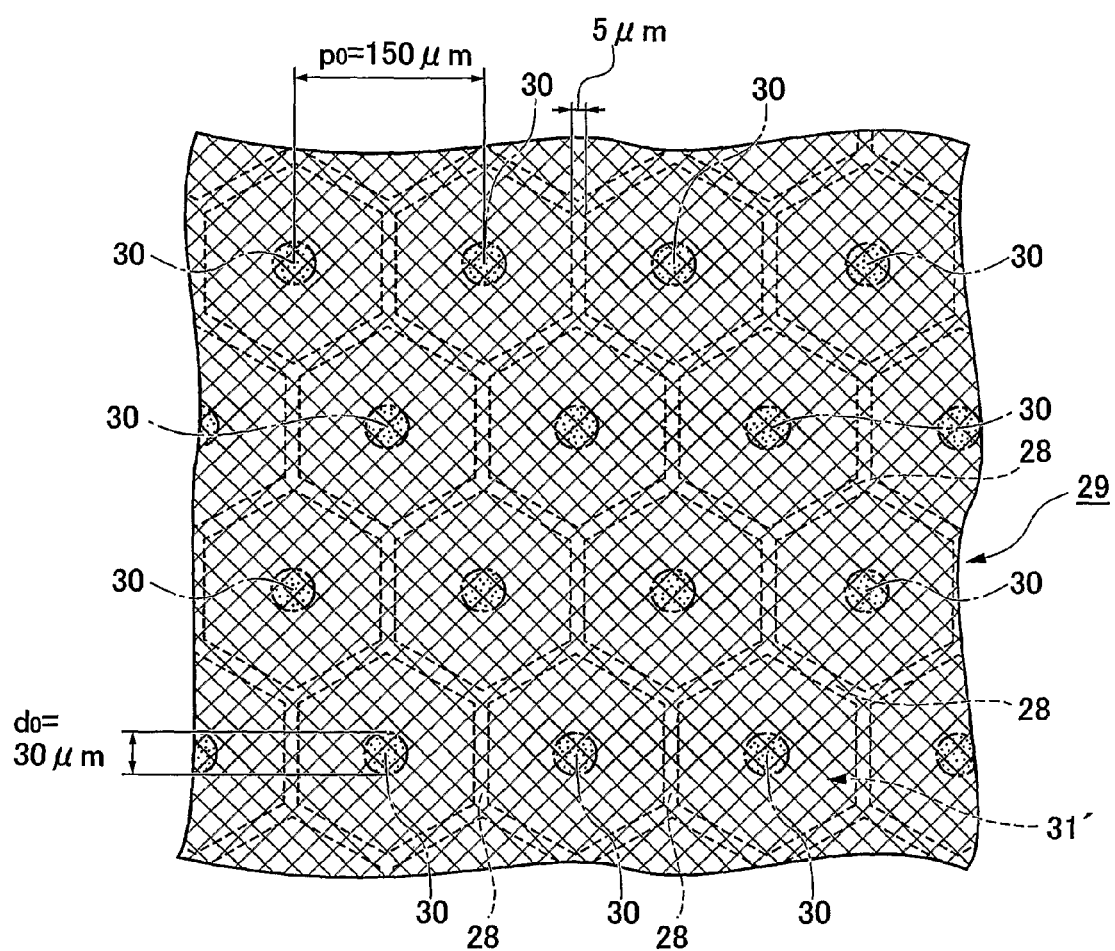
FIG. 10 is a plan view illustrating a state in which circular regions of the resist film illustrated in FIG. 8E are subjected to exposure.

Then, referring to FIG. 10, circular regions 30, positioned in the centers of regions surrounded by the regularly-arranged hexagonal grooves 28, are exposed, and unexposed portions 31' of the resist thin-film 29 are removed by a development process.

Figure 8F:
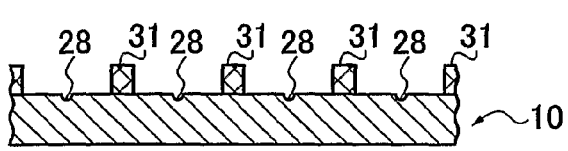
FIG. 8F is a cross-sectional explanatory view illustrating the method of producing the hollow structure forming substrate according to the second embodiment of the present invention, in which the metal substrate formed with cylindrical resist bodies is illustrated.

Thereby, as illustrated in FIG. 8F, cylindrical resist bodies 31, which are arranged regularly on the metal substrate 10, are formed on the metal substrate 10. A diameter d0 of each of the cylindrical resist bodies 31 is preferably about 15 µm, and a pitch p0 between the adjacent cylindrical resist bodies 31 is preferably about 150 µm. The cylindrical resist body 31 becomes or corresponds to an inside diameter of a gas leading-out part, which will be described later in detail.

Figure 8G:
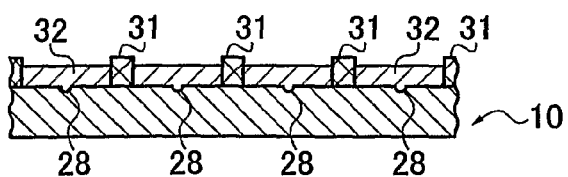
FIG. 8G is a cross-sectional explanatory view illustrating the method of producing the hollow structure forming substrate according to the second embodiment of the present invention, in which the metal substrate formed with a nickel electroforming film is illustrated.

Next, as illustrated in FIG. 8G, a nickel electroforming film 32 as a metal thin-film for example is formed through a nickel electroforming method, in which the cylindrical resist bodies 31 are used as a mask. A film-thickness of the nickel electroforming film 32 is preferably set to the extent that cylindrical resist bodies 31 are not buried by the nickel electroforming film 32 through the nickel electroforming. In the present embodiment, the film-thickness of the nickel electroforming film 32 is set at about 15 µm, although it is not limited thereto.

Figure 8H:
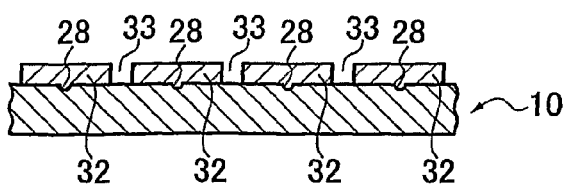
FIG. 8H is a cross-sectional explanatory view illustrating the method of producing the hollow structure forming substrate according to the second embodiment of the present invention, in which the metal substrate formed with cylindrical recesses is illustrated.

Next, the metal substrate 10 is washed, and thereafter, the cylindrical resist bodies 31 are removed. Thereby, as illustrated in FIG. 8H, the metal substrate 10 having the nickel electroforming film 32, in which regularly-arranged cylindrical recesses 33 are formed, is obtained.

Figure 8I:
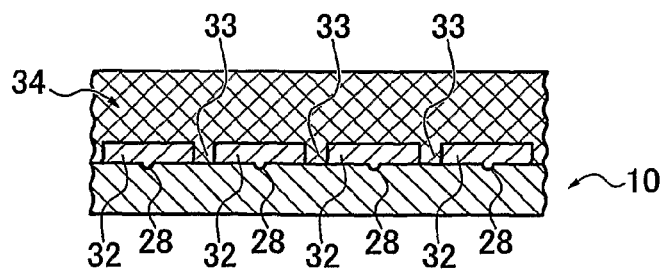
FIG. 8I is a cross-sectional explanatory view illustrating the method of producing the hollow structure forming substrate according to the second embodiment of the present invention, in which the metal substrate formed with a resist film, formed in such a manner as to fill in the cylindrical recesses of the nickel electroforming film, is illustrated.

Then, as illustrated in FIG. 8I, a resist thick-film 34 is formed on the metal substrate 10. In the present embodiment, a film-thickness of the resist thick-film 34 is preferably from about 50 µm to about 60 µm.

Figure 11:
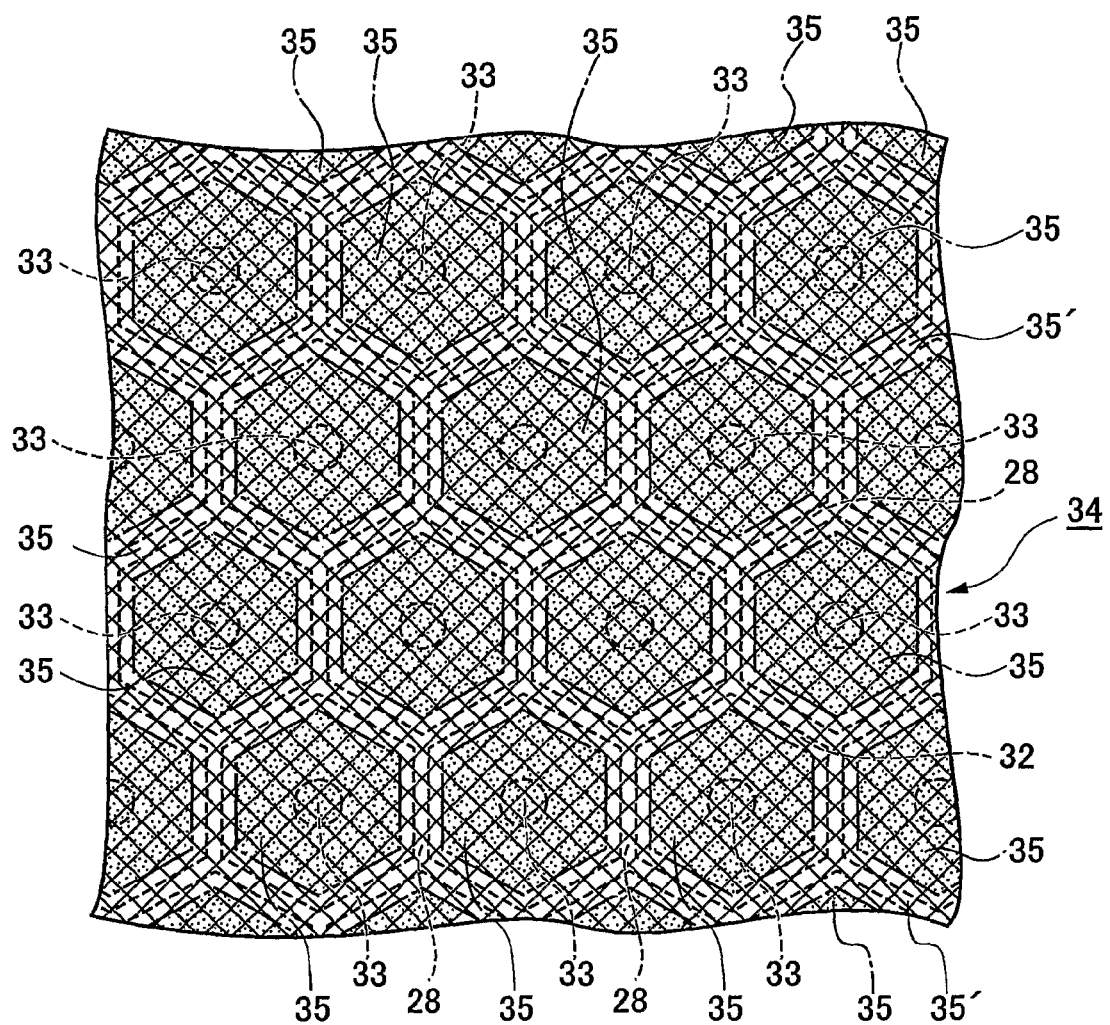
FIG. 11 is a plan view illustrating a state in which hexagonal regions of the resist film illustrated in FIG. 8I are subjected to exposure.

Subsequently, as illustrated in FIG. 11, regularly-arranged hexagonal regions 35, which are coaxial with the cylindrical recesses 33, respectively, are exposed. In the present embodiment, a length of a side of the hexagonal region 35 is about 70 µm, although it is not limited thereto.

Figure 8J:
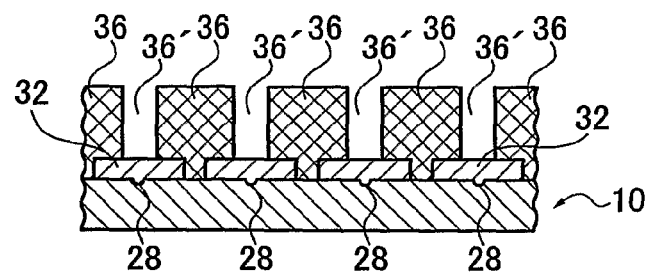
FIG. 8J is a cross-sectional explanatory view illustrating the method of producing the hollow structure forming substrate according to the second embodiment of the present invention, in which the metal substrate, wherein hexagonal cylindrical resist bodies and hexagonal cylindrical grooves are formed, is illustrated.

Then, unexposed portions 35' of the resist thick-film 34, which correspond to rim parts of the resist thick-film 34, are removed by a development process. Thereby, as illustrated in FIG. 8J, regularly-arranged hexagonal cylindrical resist bodies 36 are formed. A space between the hexagonal cylindrical resist bodies 36 becomes or corresponds to hexagonal cylindrical grooves 36'.

Figure 8K:
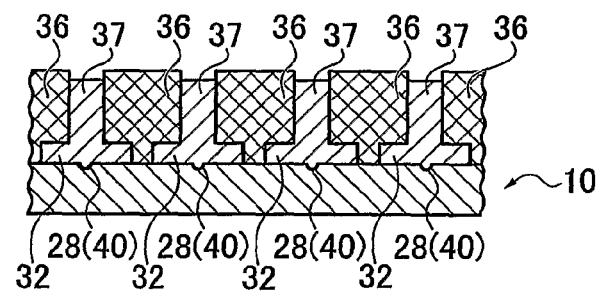
FIG. 8K is a cross-sectional explanatory view illustrating the method of producing the hollow structure forming substrate according to the second embodiment of the present invention, in which the metal substrate, wherein a nickel electroforming film is formed in the hexagonal cylindrical grooves, is illustrated.

Subsequently, as illustrated in FIG. 8K, by using the hexagonal cylindrical resist bodies 36 as a mask, a nickel electroforming film 37 as a metal thick-film for example is formed through a nickel electroforming method. A film-thickness of the nickel electroforming film 37 is set to the extent that the hexagonal cylindrical resist bodies 36 are not buried by the nickel electroforming film 37 through the nickel electroforming. In the present embodiment, the film-thickness of the nickel electroforming film 37 is set at about 40 µm, although it is not limited thereto. It is to be noted that the nickel electroforming film 37 is integrated with the nickel electroforming film 32.

Figure 8L:
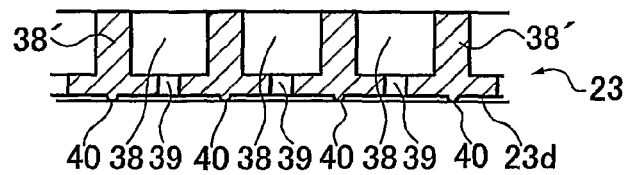
FIG. 8L is a cross-sectional explanatory view illustrating the method of producing the hollow structure forming substrate according to the second embodiment of the present invention, in which a state that a structure, including the nickel electroforming film and the hexagonal cylindrical resist bodies, is separated from the metal substrate and the hexagonal cylindrical resist bodies are removed is illustrated.

Next, the nickel electroforming film 37 is detached from the metal substrate 10 with a suitable known method. Thereafter, the hexagonal cylindrical resist bodies 36 are removed. Thereby, the hollow structure forming substrate 23 illustrated in FIG. 8L is obtained.

Figure 8M:
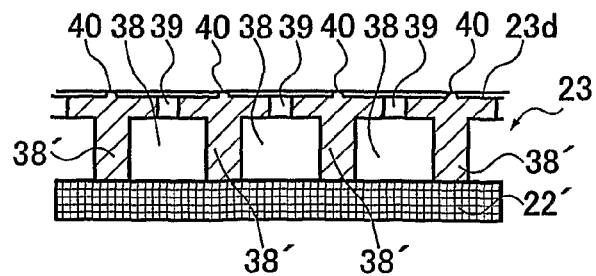
FIG. 8M is a cross-sectional explanatory view illustrating the method of producing the hollow structure forming substrate according to the second embodiment of the present invention, in which the hollow structure forming substrate, with an adhesive sheet attached to a back surface thereof, as a finished product is illustrated.
Figure 12A:
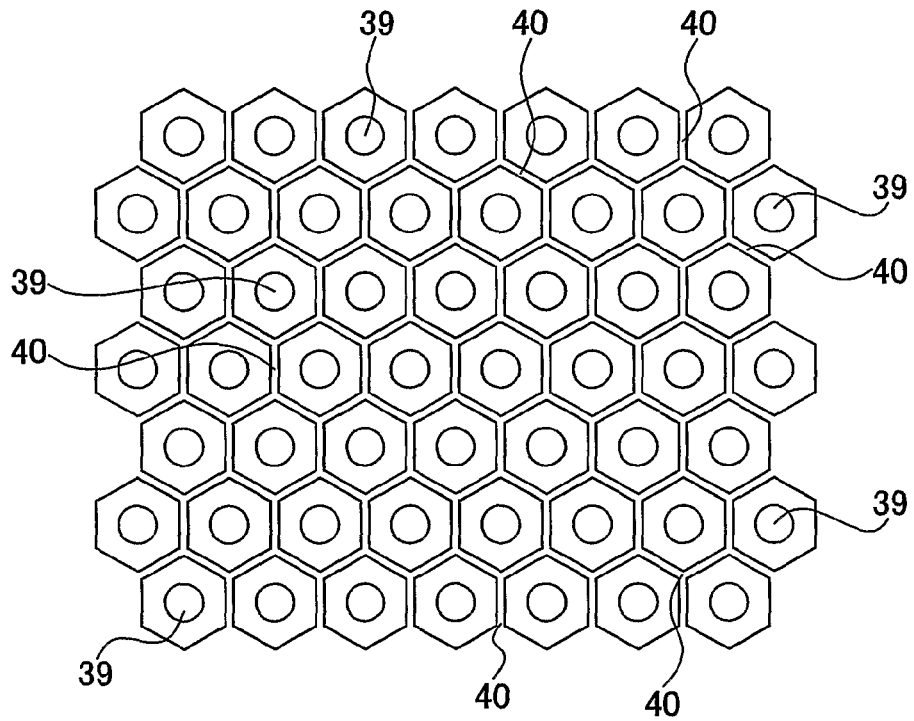
FIG. 12A is an explanatory plan view illustrating a configuration of the hollow structure forming substrate according to the second embodiment, in which a state that the hollow structure forming substrate illustrated in FIG. 8L is seen from a front surface thereof is illustrated.
Figure 12B:
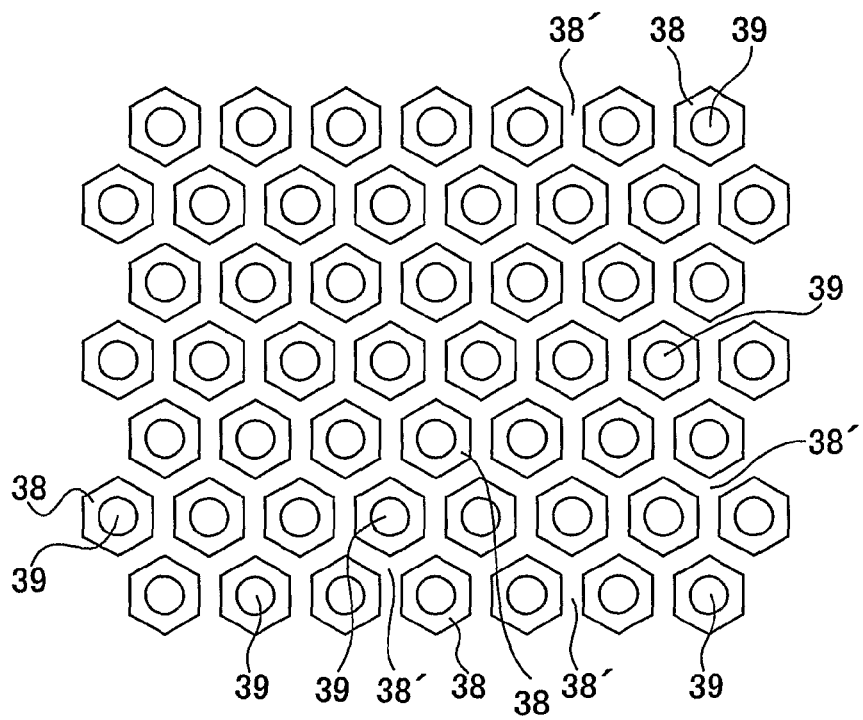
FIG. 12B is an explanatory plan view illustrating a configuration of the hollow structure forming substrate according to the second embodiment, in which a state that the hollow structure forming substrate illustrated in FIG. 8L is seen from the back surface thereof is illustrated.

As illustrated in FIG. 12A, the hollow structure forming substrate 23 is formed with cylindrical openings 39 and the hexagonal annular projections 40 on a side of a front surface of the hollow structure forming substrate 23, in which each of the cylindrical openings 39 is formed at a predetermined pitch, and each of the hexagonal annular projections 40 protrudes outwardly from the front surface. In addition, as illustrated in FIG. 12B, hexagonal cylindrical recesses 38, which are surrounded by hexagonal partition walls 38', respectively, are formed on a side of a back surface of the hollow structure forming substrate 23 at a predetermined pitch. As illustrated in FIG. 8M, a back surface of the hollow structure forming substrate 23 is sealed by, for example but not limited to, an adhesive sheet 22'.

Each of the hexagonal cylindrical recesses 38 functions as the gas-retaining space for retaining gas or air, whereas each of the cylindrical openings 39 functions as the gas leading-out part which leads out the gas retained inside of the hexagonal cylindrical recess 38 toward outside of the hexagonal cylindrical recess 38.

Now, a method of forming or producing a hollow structure by using the hollow structure forming substrate 23 according to the present embodiment will be described with reference to FIGS. 13A to 13C.

In the present second embodiment of the invention, a water-soluble ultraviolet curing resin, in which alkoxyacrylate of "PEG400DA", available from Daicel-Cytec Company, Ltd., is added with fluorine-based surfactant of "Novec (Registered Trademark) FC-4430", available from 3M Company, is used as the plastic-deformable material.

First, the above plastic-deformable material is coated on the surface 23" of the hollow structure forming substrate 23, and the hollow structure forming substrate 23 on which the above plastic-deformable material is coated is then set in the spin-coater device. In the present embodiment, the hollow structure forming substrate 23 is rotated in the spin-coater device, for example, for 10 seconds with the number of rotations of 2000 rpm, although it is not limited thereto, so as to form the plastic-deformation film 4 on the surface 23" of the hollow structure forming substrate 23 as illustrated in FIG. 13A.

Then, the hollow structure forming substrate 23, formed with the plastic-deformation film 4, is set in a vacuum container 125, and internal pressure of the vacuum container 125 is depressurized to about 100 Kpa (1 atmosphere) to about 10 KPa, for example.

Figure 13A:
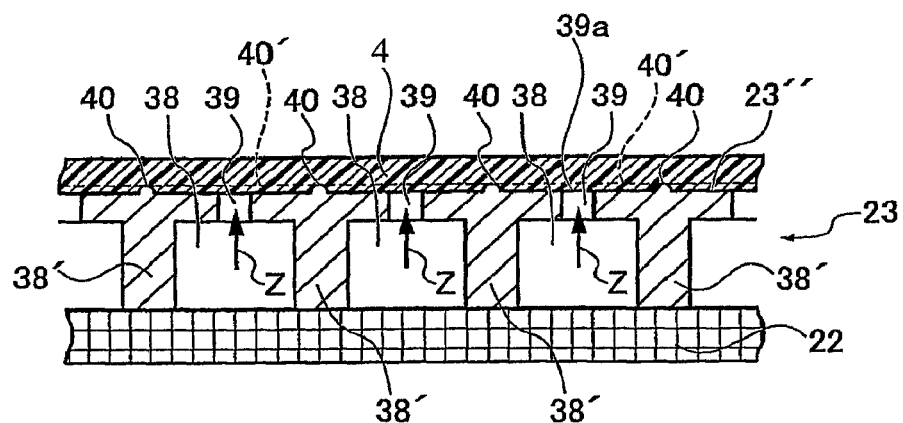
FIG. 13A is a vertical-sectional explanatory view for producing a hollow structure by using the hollow structure forming substrate illustrated in FIG. 8M, in which a state that a plastic-deformation film is formed on the hollow structure forming substrate is illustrated.
Figure 13B:
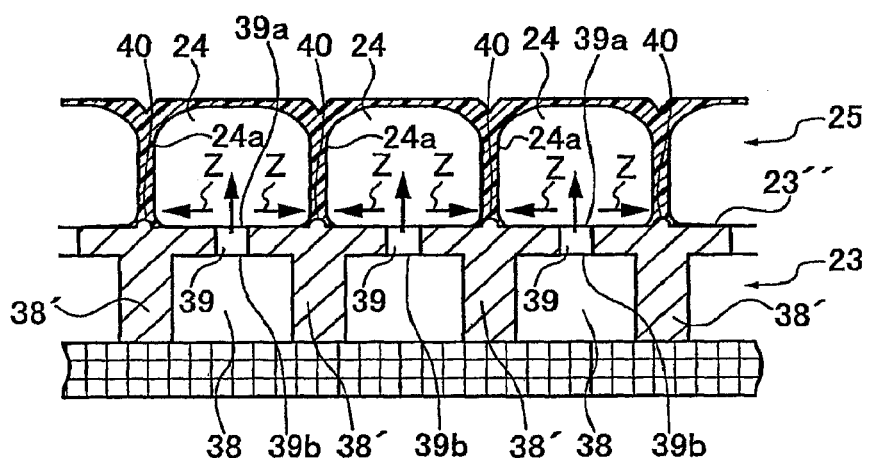
FIG. 13B is a vertical-sectional explanatory view for producing the hollow structure by using the hollow structure forming substrate illustrated in FIG. 8M, in which a process of expansion and extension of the plastic-deformation film illustrated in FIG. 13A is illustrated.

Thereby, the air or the gas in each of the hexagonal cylindrical recesses 38 expands by about 10 times, and thus the plastic-deformation film 4 expands and extends by the expanding pressure (for example, as illustrated by arrows Z) of the gas, as illustrated in FIG. 13B, to form the hollow structure 25 having the regular hollow parts 24 (or cells). A shape of each of the hollow parts 24 becomes substantially uniform mutually, since an amount of air retained in each of the hexagonal cylindrical recesses 38 is substantially equal mutually. Therefore, the hollow structure 25 having the uniform hollow parts 24 is obtained.

Figure 13C:
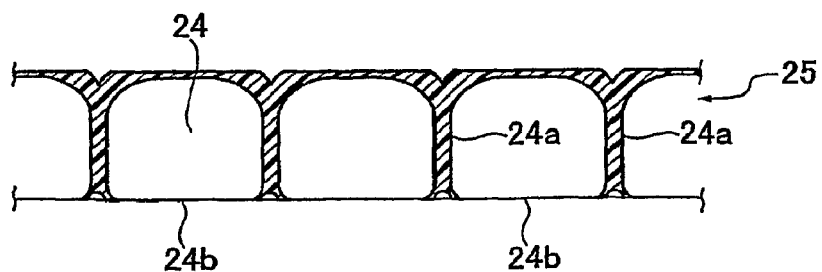
FIG. 13C is a vertical-sectional explanatory view for producing the hollow structure by using the hollow structure forming substrate illustrated in FIG. 8M, in which the hollow structure produced through the process illustrated in FIG. 13B is illustrated.

Referring to FIG. 13C, the hollow structure 25 thus obtained is detached from the hollow structure forming substrate 23. The hollow structure 25 is utilized, for example but limited to, for an electrophoretic display in which a solvent, wherein charged coloring matter particles or charged coloring particles are dispersed, is filled in the hollow parts 24.

In the present second embodiment, the hollow structure 25, in which a length of a side of the hollow part 24 is about 80 μm, in which a depth of the hollow part 24 is about 60 μm, and in which a wall-thickness of a partition wall 24a of the hollow part 24 (or the cell) is about 3 μm, for example, is obtained.

According to the hollow structure forming substrate 23 of the present second embodiment, the gas leading-out parts are arranged in a hexagonal close-packed manner. Therefore, the hollow structure 25 is formed in the honeycomb configuration, and hence, it is possible to further improve strength of the hollow structure as compared with the hollow structure according to the first embodiment.

Normally, metals have a hydrophilic property. Thus, with reference to FIG. 13B, the plastic-deformable material attached to a surface 23" expands and extends horizontally in the vicinity of the surface 23", as illustrated by the arrows Z.

Referring to FIG. 7B, when taking note of the certain cylindrical opening 22 of the hollow structure forming substrate 23 having the construction described in the first embodiment, the plastic-deformable material spreads horizontally from the opening 22a, as a starting point, of the cylindrical opening 22 in the vicinity of the surface 23" of the cylindrical opening 22, since the metals have the hydrophilic property. The opening diameter of the opening 24b of the hollow part 24 can be determined, for example, by a contact angle θ of the plastic-deformable material and the surface 23", by an influence of collision of the plastic-deformable materials, which spread horizontally from the openings 22a as the starting points of other cylindrical openings 22 located in the periphery of the certain cylindrical opening 22, with the plastic-deformable material which spreads horizontally from the certain cylindrical opening 22, by the expanding pressure, and by the viscosity of the plastic-deformable material.

In addition, according to the first embodiment described above, the contact angle θ of the plastic-deformable material and the surface of the metal is small, and the plastic-deformable material becomes extremely thin in the very vicinity of the opening 22a. Thus, the opening diameter of the opening 24b slightly larger than the opening diameter of the opening 22a can be obtained.

On the other hand, according to the present second embodiment of the invention, with reference to FIGS. 13A and 13B, the hexagonal annular projections 40, which function as partition walls, are provided. In the present second embodiment, when taking note of the certain cylindrical opening 39, the plastic-deformable material, which spreads horizontally from that certain cylindrical opening 39, will not be influenced by the plastic-deformable materials, which spread horizontally from the openings 39a as the starting points of other cylindrical openings 39 located in the periphery of that certain cylindrical opening 39, since the hexagonal annular projection 40 functions as the partition wall. Also, in the present second embodiment, a contact angle θ of the hexagonal annular projection 40 and the plastic-deformable material is small. Hence, the plastic-deformable material collides with the hexagonal annular projection 40, and expands and extends along a vertical direction to which the hexagonal annular projection 40 extends.

As a result, a contact area of the surface 23" of the hollow structure forming substrate 23 and the plastic-deformable material becomes small, and thus, it is possible to form the opening diameter of the opening 24b of the hollow part 24 larger than the opening diameter of the opening 24b of the hollow part 24 according to the first embodiment.

In addition, a predetermined amount of the plastic-deformable material is stored in a part of recess 40' surrounded by the hexagonal annular projections 40 at the time when the plastic-deformation film 4 is formed, for example, by the spin-coating method. Therefore, homogenization of the film-thickness of the hollow structure 24 is further achieved. Meanwhile, a reference numeral 39b denotes an opening facing the hexagonal cylindrical recess 38.

Now, a third embodiment of the present invention will be described with reference to FIGS. 14A to 14M. Note that elements or parts of the present embodiment same as or similar to those described in the above embodiments are attached with the same reference numbers, and explanation thereto will not be given in detail, for the sake of convenience of explanation.

Figure 14A:
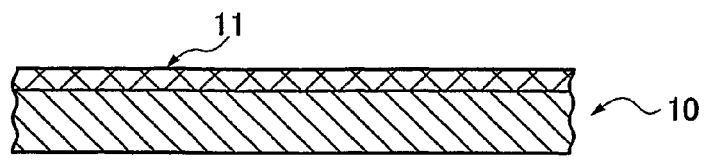
FIG. 14A is a cross-sectional explanatory view illustrating a method of producing a hollow structure forming substrate according to a third embodiment of the present invention, in which a state that a resist film is formed on a metal substrate is illustrated.

Referring to FIG. 14A, first, the resist thin-film 11 is formed on the metal substrate 10, preferably through the spin-coating method. In the present embodiment, the metal substrate 10 includes a copper material, and the film-thickness of the resist film 11 is about 1 µm, for example. In the present embodiment, "TSMR-8900" available from Tokyo Ohka Kogyo Co., Ltd., is used for a resist, although it is not limited thereto.

Figure 14B:
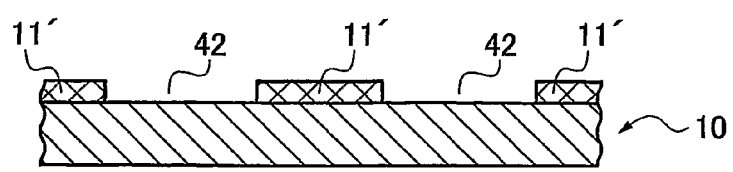
FIG. 14B is a cross-sectional explanatory view illustrating the method of producing the hollow structure forming substrate according to the third embodiment of the present invention, in which the metal substrate having cylindrical spaces is illustrated.
Figure 15:
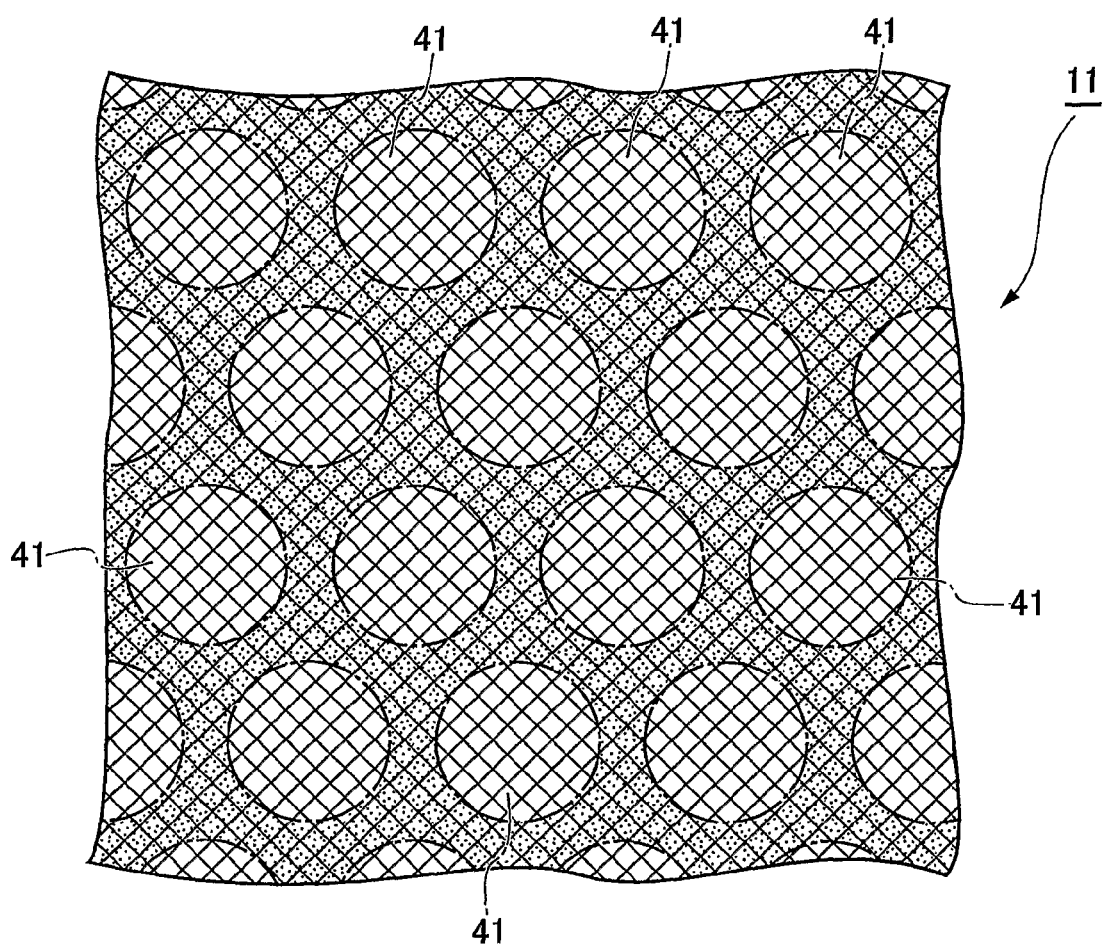
FIG. 15 is a plan view illustrating a state in which portions of the resist film excluding circular regions of the resist film illustrated in FIG. 14A are subjected to exposure.

Then, referring to FIG. 15, portions of the resist film 11 excluding cylindrical regions 41 arranged in a cubic close-packed manner are exposed, and a development process is then performed to remove the cylindrical regions 41. Thereby, as illustrated in FIG. 14B, resist films 11' having cylindrical spaces 42 in which the cylindrical regions 41 are removed, are formed. In the present embodiment, an inside diameter of the cylindrical space 42 is about 50 µm, and a distance between the centers of the mutually adjacent cylindrical spaces 42 is about 150 µm, for example.

Figure 14C:
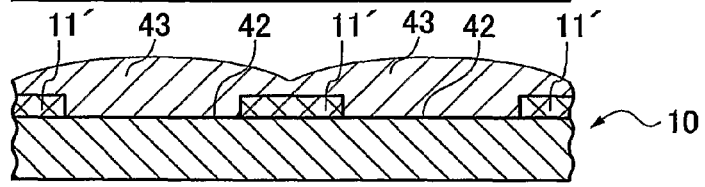
FIG. 14C is a cross-sectional explanatory view illustrating the method of producing the hollow structure forming substrate according to the third embodiment of the present invention, in which the metal substrate, wherein a nickel film is formed on the cylindrical spaces, is illustrated.

Next, as illustrated in FIG. 14C, nickel electroforming is performed to form a nickel film 43, in which the resist films 11' are used as a mask. Precipitation of nickel, for example, is started from the mutually adjacent cylindrical spaces 42. The resist film 11' is covered when the precipitation of the nickel exceeds the thickness of the resist film 11', which is 1 µm according to the present embodiment. Accordingly, a thickness of the nickel film 43 in a central part of the cylindrical space 42 is increased, while the nickel film 43 becomes thinner as going from the central part toward a peripheral part of the cylindrical space 42.

Hence, the nickel film 43, which has a hexagonal configuration in a plan view, in which the central part of the hexagonal configuration becomes or has a top part, and in which a contour part of the hexagonal configuration has a valley part, is formed in such a manner as to cover the resist film 11'.

Figure 14D:
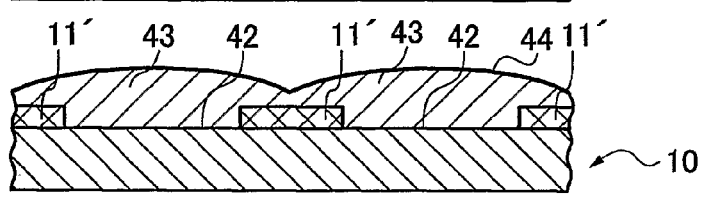
FIG. 14D is a cross-sectional explanatory view illustrating the method of producing the hollow structure forming substrate according to the third embodiment of the present invention, in which the metal substrate, wherein an oxide film is formed on the nickel film illustrated in FIG. 14C, is illustrated.
Figure 14E:
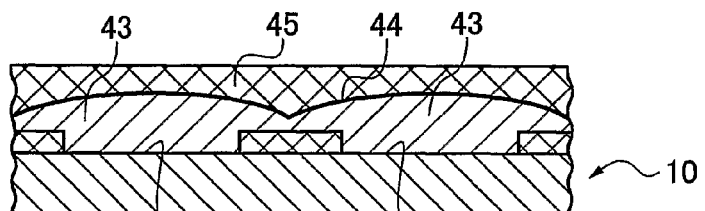
FIG. 14E is a cross-sectional explanatory view illustrating the method of producing the hollow structure forming substrate according to the third embodiment of the present invention, in which a state that a resist film is formed on the metal substrate illustrated in FIG. 14D is illustrated.

Thereafter, as illustrated in FIG. 14D, ultraviolet rays are irradiated on the nickel film 43, to form a nickel oxide film 44. Then, as illustrated in FIG. 14E, a resist thin-film 45 is formed on an upper part of the metal substrate 10 on which the nickel oxide film 44 is formed, preferably through a spin coating method. In the present embodiment, a film-thickness of the resist thin-film 45 is preferably from about 20 µm to about 30 µm, and "SU-8" available from MicroChem Corporation is used for a resist thereof, although it is not limited thereto.

Figure 16:
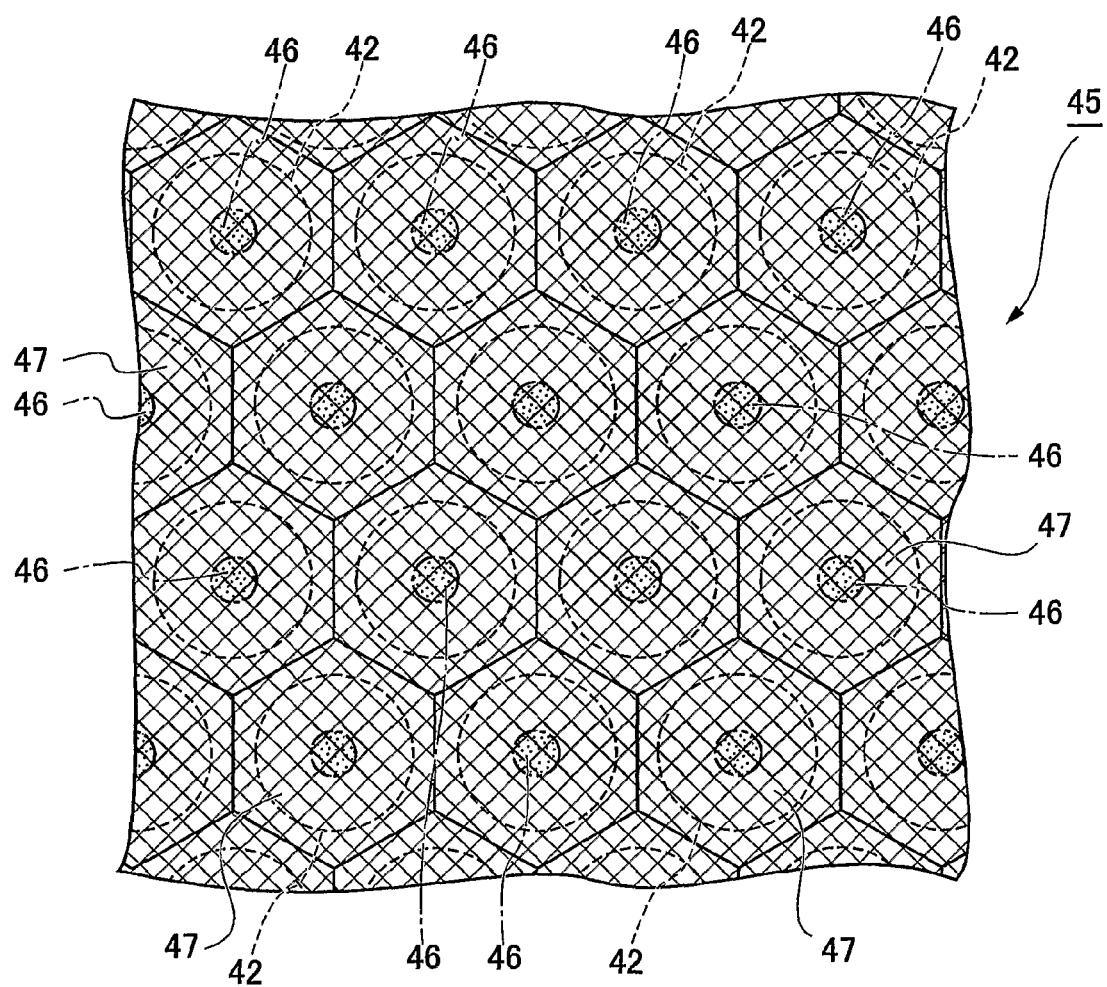
FIG. 16 is a plan view illustrating a state in which circular regions of the resist film illustrated in FIG. 14E are subjected to exposure.

Then, referring to FIG. 16, circular regions 46, positioned in the centers of regularly-arranged hexagonal regions, are exposed, and unexposed portions 47 of the resist thin-film 45 are removed by a development process.

Figure 14F:
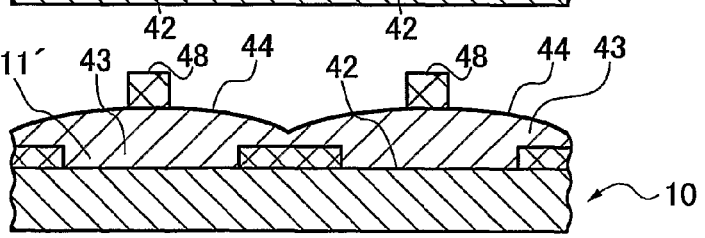
FIG. 14F is a cross-sectional explanatory view illustrating the method of producing the hollow structure forming substrate according to the third embodiment of the present invention, in which the metal substrate, wherein cylindrical resist bodies are formed on top parts of the oxide film, is illustrated.

Thereby, as illustrated in FIG. 14F, regularly-arranged cylindrical resist bodies 48 are formed on portions, which are on the top parts of the nickel film 43 and which correspond to the cylindrical spaces 42.

A diameter dO of each of the cylindrical resist bodies 48 is preferably about 15 µm, and a pitch pO between the adjacent cylindrical resist bodies 48 is preferably about 150 µm. The cylindrical resist body 48 becomes or corresponds to an inside diameter of a gas leading-out part, which will be described later in detail.

Figure 14G:
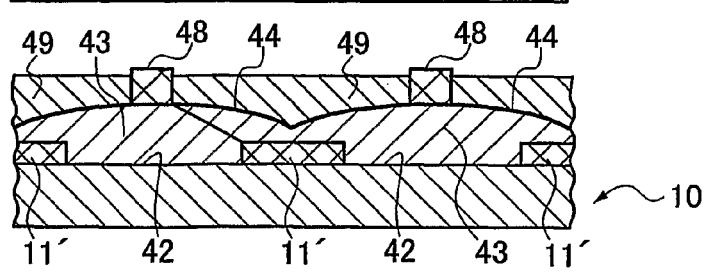
FIG. 14G is a cross-sectional explanatory view illustrating the method of producing the hollow structure forming substrate according to the third embodiment of the present invention, in which the metal substrate, wherein a nickel electroforming film is formed on the oxide film illustrated in FIG. 14F, is illustrated.

Next, as illustrated in FIG. 14G, a nickel electroforming film 49 as a metal thin-film for example is formed through a nickel electroforming method, in which the cylindrical resist bodies 48 are used as a mask. A film-thickness of the nickel electroforming film 49 is preferably set to the extent that cylindrical resist bodies 48 are not buried by the nickel electroforming film 49 through the nickel electroforming. In the present embodiment, the film-thickness of the nickel electroforming film 49 is set at about 15 µm, although it is not limited thereto.

Figure 14H:
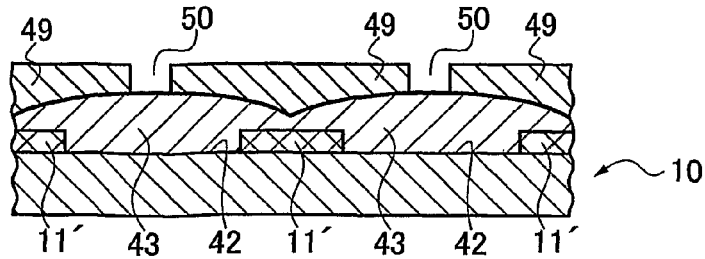
FIG. 14H is a cross-sectional explanatory view illustrating the method of producing the hollow structure forming substrate according to the third embodiment of the present invention, in which the metal substrate, wherein the cylindrical resist bodies illustrated in FIG. 14G are removed to form cylindrical recesses, is illustrated.

Next, the metal substrate 10 is washed, and thereafter, the cylindrical resist bodies 48 are removed. Thereby, as illustrated in FIG. 14H, the metal substrate 10 in which regularly-arranged cylindrical recesses 50 are formed on the nickel electroforming film 49, is obtained.

Figure 14I:
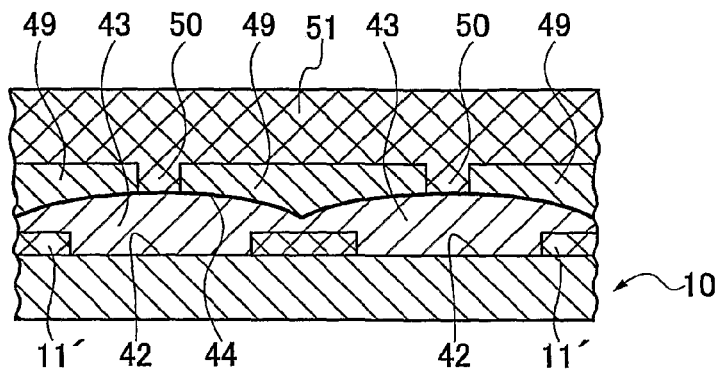
FIG. 14I is a cross-sectional explanatory view illustrating the method of producing the hollow structure forming substrate according to the third embodiment of the present invention, in which the metal substrate formed with a resist film, formed in such a manner as to fill in the cylindrical recesses of the nickel electroforming film, is illustrated.
Figure 17:
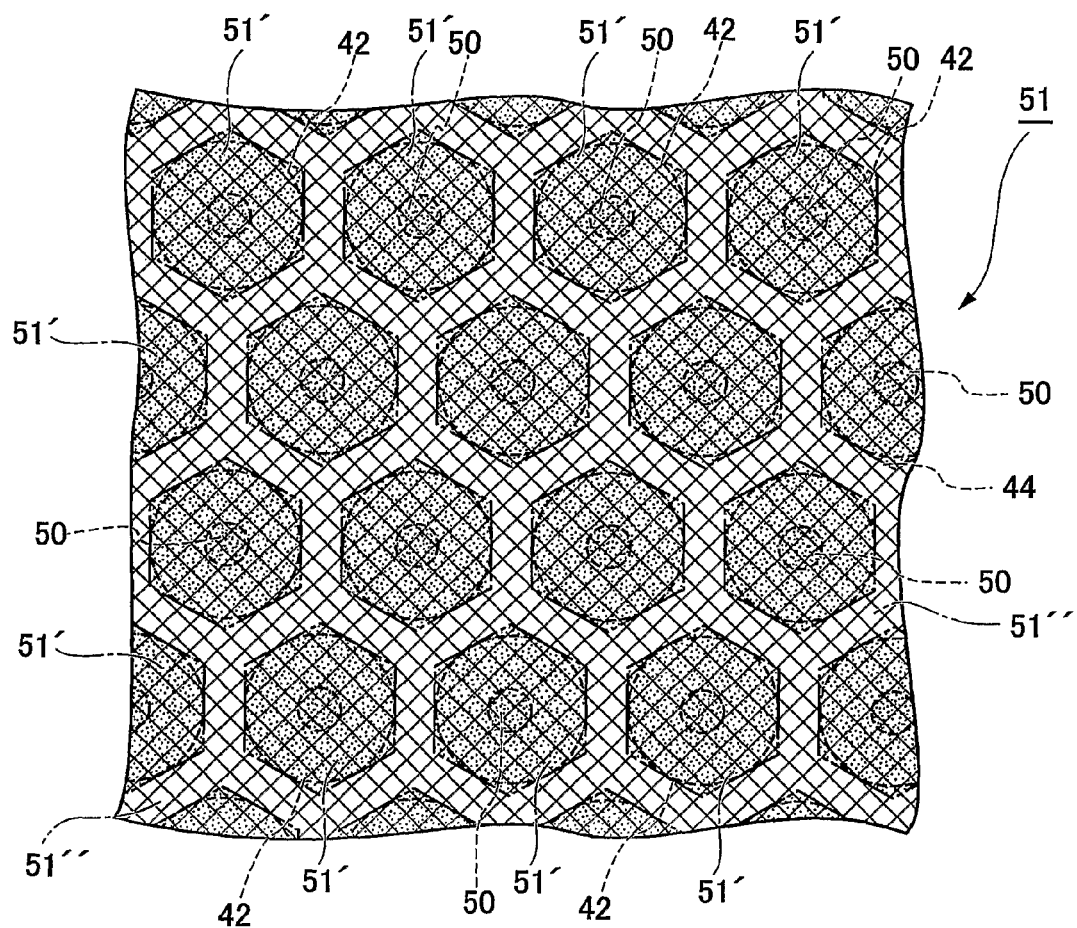
FIG. 17 is a plan view illustrating a state in which circular regions of the resist film illustrated in FIG. 14I are subjected to exposure.

Then, as illustrated in FIG. 14I, a resist thick-film 51 is formed. In the present embodiment, a film-thickness of the resist thick-film 51 is preferably from about 50 µm to about 60 µm. Subsequently, as illustrated in FIG. 17, regularly-arranged hexagonal regions 51', which are coaxial with the cylindrical recesses 50, respectively, are exposed. In the present embodiment, a length of a side of the hexagonal region 51' is about 70 µm, although it is not limited thereto.

Figure 14J:
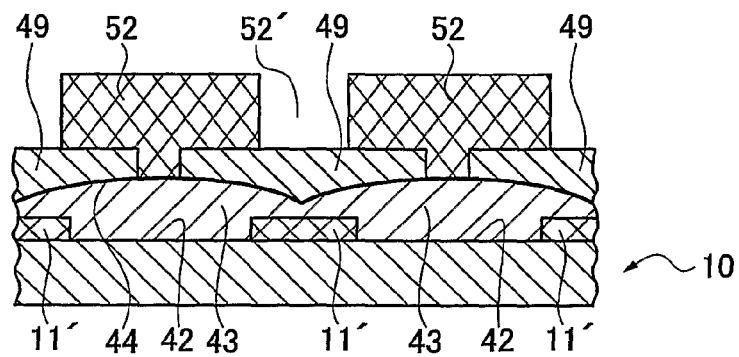
FIG. 14J is a cross-sectional explanatory view illustrating the method of producing the hollow structure forming substrate according to the third embodiment of the present invention, in which the metal substrate, wherein hexagonal cylindrical resist bodies and hexagonal cylindrical grooves are formed, is illustrated.

Then, unexposed portions 51' of the resist thick-film 51 are removed by a development process. Thereby, as illustrated in FIG. 14J, regularly-arranged hexagonal cylindrical resist bodies 52 are formed. A space between the hexagonal cylindrical resist bodies 52 becomes or corresponds to hexagonal cylindrical grooves 52'.

Figure 14K:
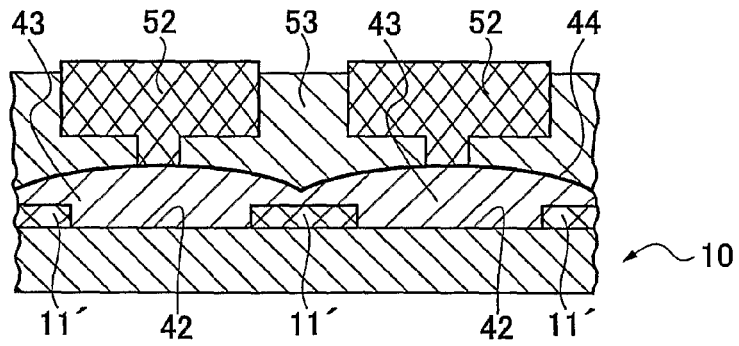
FIG. 14K is a cross-sectional explanatory view illustrating the method of producing the hollow structure forming substrate according to the third embodiment of the present invention, in which the metal substrate, wherein a nickel electroforming film is formed in the hexagonal cylindrical grooves, is illustrated.

Subsequently, as illustrated in FIG. 14K, by using the hexagonal cylindrical resist bodies 52 as a mask, a nickel electroforming film 53 as a metal thick-film for example is formed through a nickel electroforming method. A film-thickness of the nickel electroforming film 53 is set to the extent that the hexagonal cylindrical resist bodies 52 are not buried by the nickel electroforming film 53 through the nickel electroforming. In the present embodiment, the film-thickness of the nickel electroforming film 53 is set at about 40 µm, although it is not limited thereto.

Figure 14L:
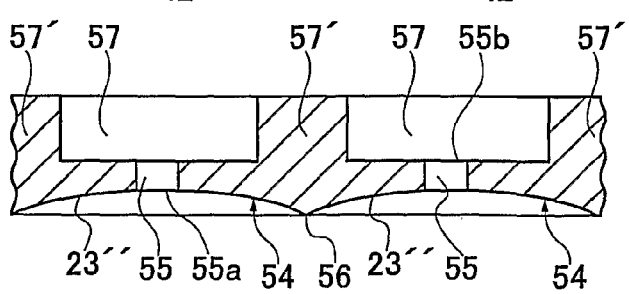
FIG. 14L is a cross-sectional explanatory view illustrating the method of producing the hollow structure forming substrate according to the third embodiment of the present invention, in which a state that a structure, including the nickel electroforming film and the hexagonal cylindrical resist bodies, is separated from the oxide film and the hexagonal cylindrical resist bodies are removed is illustrated.

Next, the nickel electroforming film 53, formed through the electroforming, is detached from the nickel oxide film 44 with a suitable known method. Thereafter, the hexagonal cylindrical resist bodies 52 are removed. Thereby, the hollow structure forming substrate 23 illustrated in FIG. 14L is obtained. Here, a reference numeral 55a denotes an opening facing the surface 23", whereas a reference numeral 55b denotes an opening facing a gas-retaining space.

Figure 14M:
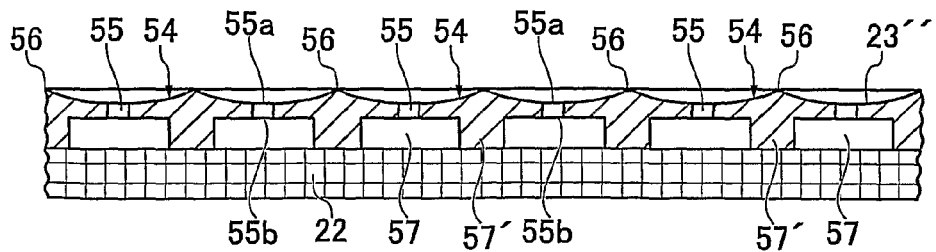
FIG. 14M is a cross-sectional explanatory view illustrating the method of producing the hollow structure forming substrate according to the third embodiment of the present invention, in which the hollow structure forming substrate, with an adhesive sheet attached to a back surface thereof, as a finished product is illustrated.

As illustrated in FIG. 14M, a back surface of the hollow structure forming substrate 23 is sealed by, for example but not limited to, an adhesive sheet 22'.

Figure 18A:
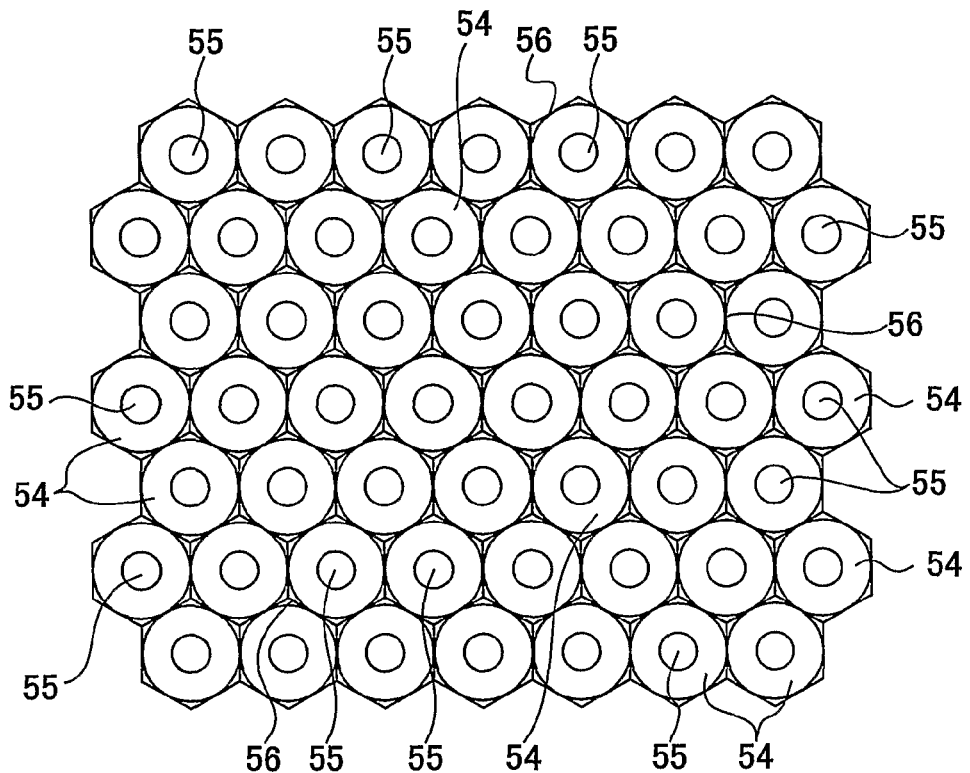
FIG. 18A is an explanatory plan view illustrating a configuration of the hollow structure forming substrate according to the third embodiment, in which a state that the hollow structure forming substrate illustrated in FIG. 14L is seen from a front surface thereof is illustrated.
Figure 18B:
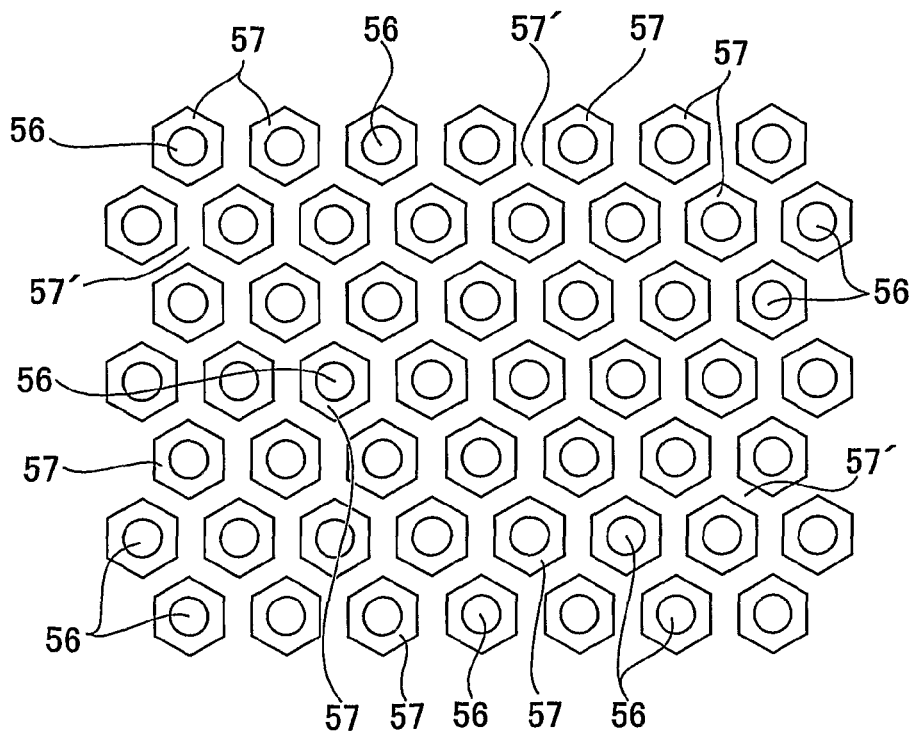
FIG. 18B is an explanatory plan view illustrating a configuration of the hollow structure forming substrate according to the third embodiment, in which a state that the hollow structure forming substrate illustrated in FIG. 14L is seen from the back surface thereof is illustrated.

As illustrated in FIG. 14M, the hollow structure forming substrate 23 has curved recesses 54 on a side of a front surface of the hollow structure forming substrate 23, and cylindrical openings 55 are formed on central parts of the curved recesses 54 at a predetermined pitch, respectively. In addition, as illustrated in FIG. 18A, the adjoining curved recesses 54 are partitioned or divided by an annular contour wall 56 having a substantially hexagonal configuration. The annular contour wall 56 structures a hexagonal annular projection. Also, as illustrated in FIG. 18B, hexagonal cylindrical recesses 57, which are surrounded by hexagonal partition walls 57', are formed on a back surface side of the hollow structure forming substrate 23.

Figure 19A:
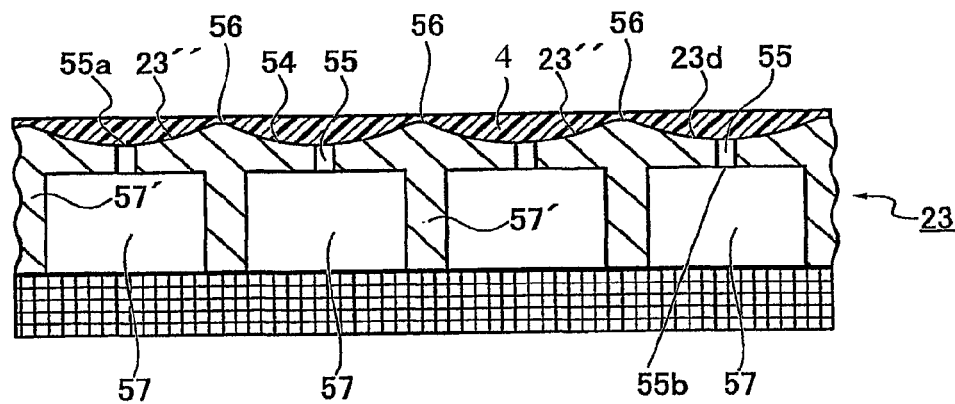
FIG. 19A is a vertical-sectional explanatory view for producing a hollow structure by using the hollow structure forming substrate illustrated in FIG. 14M, in which a state that a plastic-deformation film is formed on the hollow structure forming substrate is illustrated.

Now, a method of forming or producing a hollow structure by using the hollow structure forming substrate 23 according to the present embodiment will be described with reference to FIGS. 19A to 19C.

In the present third embodiment of the invention, a water-soluble ultraviolet curing resin, in which epoxy acrylate of "AQ9", available from Arakawa Chemical Industries, Ltd., is added with fluorine-based surfactant of "Novec (Registered Trademark) FC-4430", available from 3M Company, is used as the plastic-deformable material.

First, the above plastic-deformable material is coated on the surface 23" of the hollow structure forming substrate 23, and the hollow structure forming substrate 23 on which the above plastic-deformable material is coated is then set in the spin-coater device. In the present embodiment, the hollow structure forming substrate 23 is rotated in the spin-coater device, for example, for 10 seconds with the number of rotations of 2000 rpm, although it is not limited thereto, so as to form the plastic-deformation film 4 on the surface 23" of the hollow structure forming substrate 23 as illustrated in FIG. 19A.

Then, the hollow structure forming substrate 23, formed with the plastic-deformation film 4, is set in a vacuum container 125, and internal pressure of the vacuum container 125 is depressurized to about 100 Kpa (1 atmosphere) to about 10 KPa, for example.

Figure 19B:
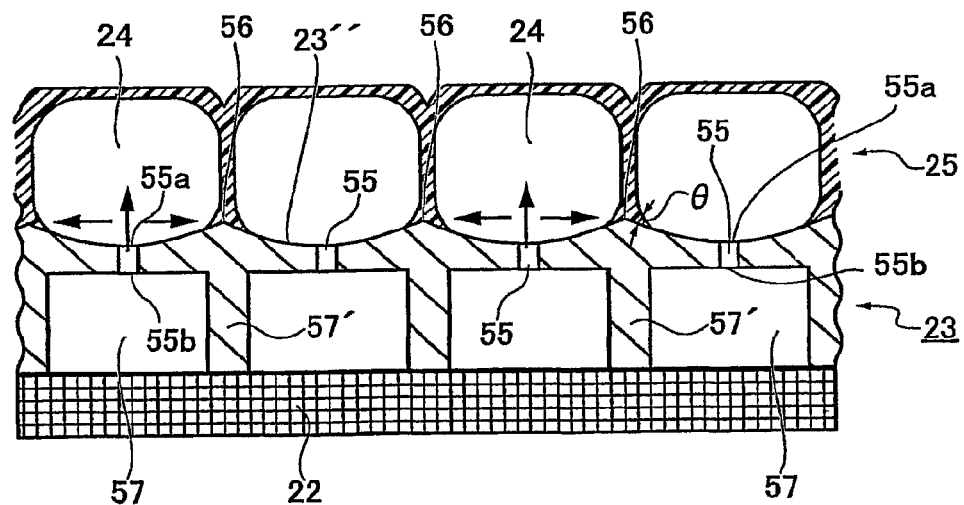
FIG. 19B is a vertical-sectional explanatory view for producing the hollow structure by using the hollow structure forming substrate illustrated in FIG. 14M, in which a process of expansion and extension of the plastic-deformation film illustrated in FIG. 19A is illustrated.

Thereby, the air or the gas in each of the hexagonal cylindrical recesses 57 expands by about 10 times, and thus the plastic-deformation film 4 expands and extends by the expanding pressure (for example, as illustrated by arrows Z) of the gas, as illustrated in FIG. 19B, to form the hollow structure 25 having the regular hollow parts 24 (or cells). A shape of each of the hollow parts 24 becomes substantially uniform mutually, since an amount of air retained in each of the hexagonal cylindrical recesses 57 is substantially equal mutually. Therefore, the hollow structure 25 having the uniform hollow parts 24 is obtained.

Figure 19C:
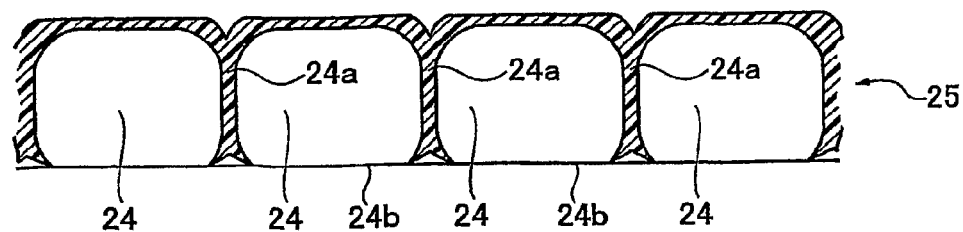
FIG. 19C is a vertical-sectional explanatory view for producing the hollow structure by using the hollow structure forming substrate illustrated in FIG. 14M, in which the hollow structure produced through the process illustrated in FIG. 19B is illustrated.

Referring to FIG. 19C, the hollow structure 25 thus obtained is detached from the hollow structure forming substrate 23. The hollow structure 25 is utilized, for example but limited to, for an electrophoretic display in which a solvent, wherein charged coloring matter particles or charged coloring particles are dispersed, is filled in the hollow parts 24.

In the present third embodiment, the hollow structure 25, in which a length of a side of the hollow part 24 is about 80 μm, in which a depth of the hollow part 24 is about 60 μm, and in which a wall-thickness of a partition wall 24a of the hollow part 24 (or the cell) is about 5 μm, for example, is obtained.

According to the hollow structure forming substrate 23 of the present third embodiment, the gas leading-out parts are arranged to have a hexagonal close-packed structure. Therefore, the hollow structure 25 is formed in the honeycomb configuration, and hence, it is possible to further improve strength of the hollow structure as compared with the hollow structure according to the first embodiment.

In addition, with reference to FIG. 19B, since metals have a hydrophilic property, the plastic-deformable material attached to the surface 23" expands and extends horizontally in the vicinity of the surface 23".

Because the annular contour wall 56 or the annular contour part has a function similar to that of the hexagonal annular projection 40 according to the second embodiment, it is possible to form the opening diameter of the opening 24b of the hollow part 24 larger than the opening diameter of the opening 24b of the hollow part 24 according to the first embodiment.

Now, a fourth embodiment of the present invention will be described with reference to FIGS. 20A to 20F. Note that elements or parts of the present embodiment same as or similar to those described in the above embodiments are attached with the same reference numbers, and explanation thereto will not be given in detail, for the sake of convenience of explanation.

Figure 20A:
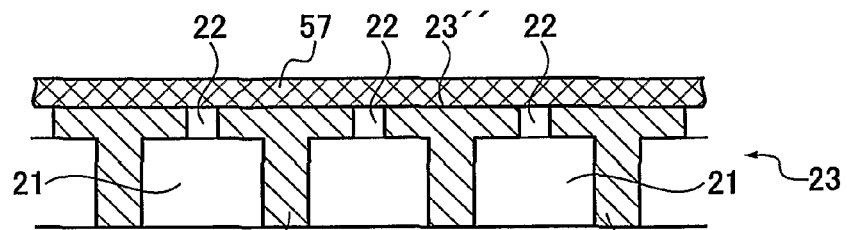
FIG. 20A is a cross-sectional explanatory view illustrating a method of producing a hollow structure forming substrate according to a fourth embodiment of the present invention, in which a state that a dry film resist is formed on a surface of the hollow structure forming substrate is illustrated.

According to the present fourth embodiment, the hollow structure forming substrate 23 is formed by a method similar to that of the first embodiment. However, in the present embodiment, the cylindrical openings 22 are arranged to have the hexagonal close-packed structure, as in the second embodiment and third embodiment. Referring to FIG. 20A, a dry film resist 57 is, first, formed and laminated on the surface 23" of the hollow structure forming substrate 23.

Figure 21:
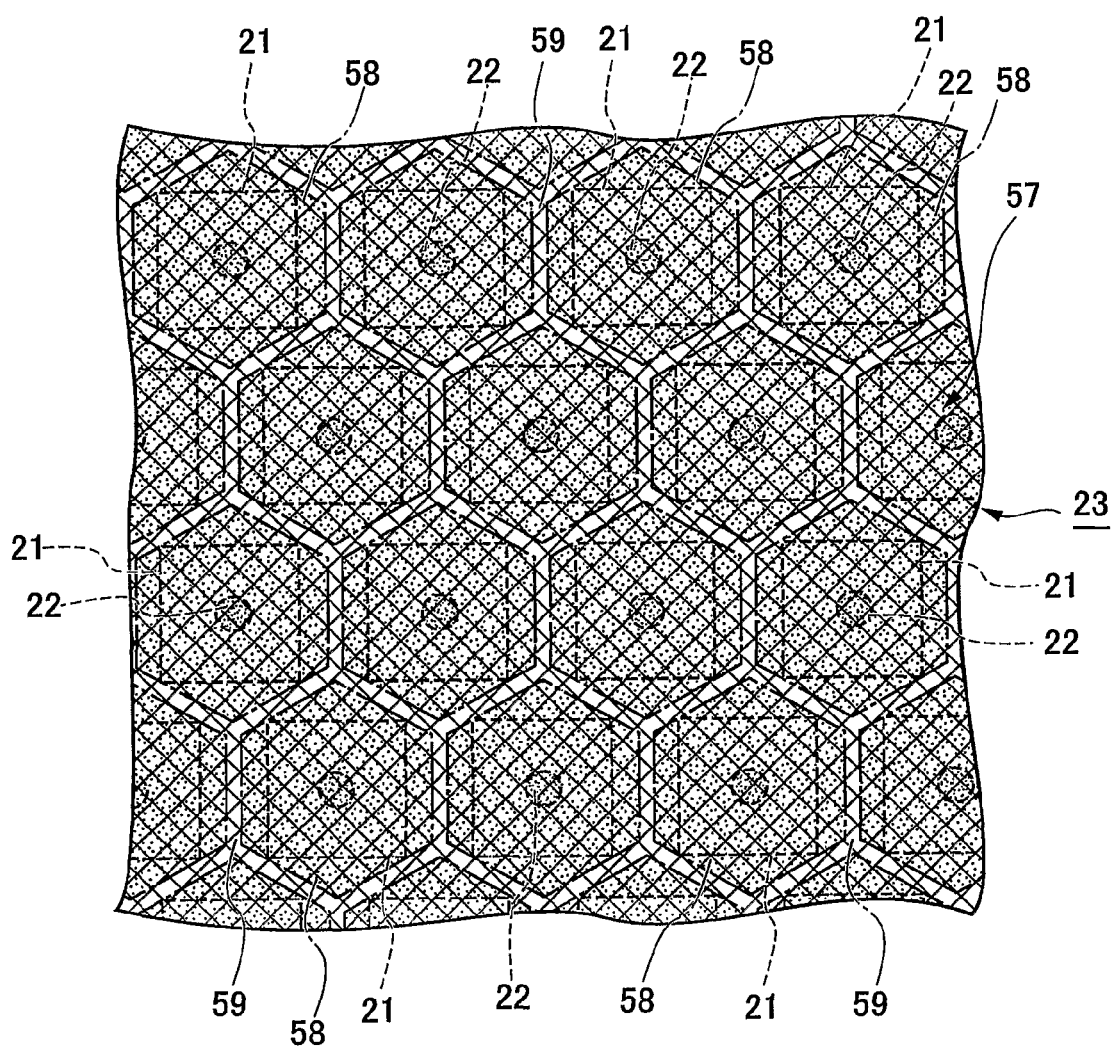
FIG. 21 is a plan view illustrating a state in which hexagonal regions illustrated in FIG. 20A are subjected to exposure.

Then, referring to FIG. 21, regularly-arranged hexagonal regions 58 are exposed, and the dry film resist 57, in which unexposed portions 59 present rim parts, is subjected to a development process, so as to remove the unexposed portions 59.

Figure 20B:
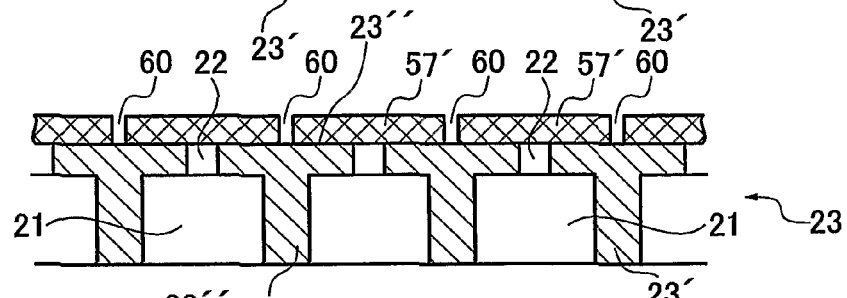
FIG. 20B is a cross-sectional explanatory view illustrating the method of producing the hollow structure forming substrate according to the fourth embodiment of the present invention, in which the dry film resist formed with annular grooves is illustrated.

Thereby, as illustrated in FIG. 20B, dry film resists 57', which are arranged in a hexagonal close-packed manner, and which are partitioned or divided by hexagonal annular grooves 60, are formed.

Figure 20C:
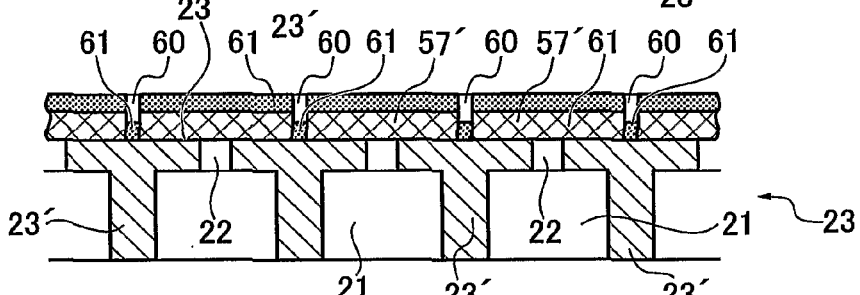
FIG. 20C is a cross-sectional explanatory view illustrating the method of producing the hollow structure forming substrate according to the fourth embodiment of the present invention, in which a state that a titanium oxide film is formed on an upper surface of the dry film resist by sputtering is illustrated.

Then, as illustrated in FIG. 20C, a sputtering process using, for example, a titanium oxide material is performed, in which the dry film resists 57' of a cubic close-packed structure are used as a mask, so as to form titanium oxide films 61. A film-thickness of the titanium oxide film 61 formed by the sputtering process is, for example, from about 100 angstrom to about 1000 angstrom.

Figure 20D:
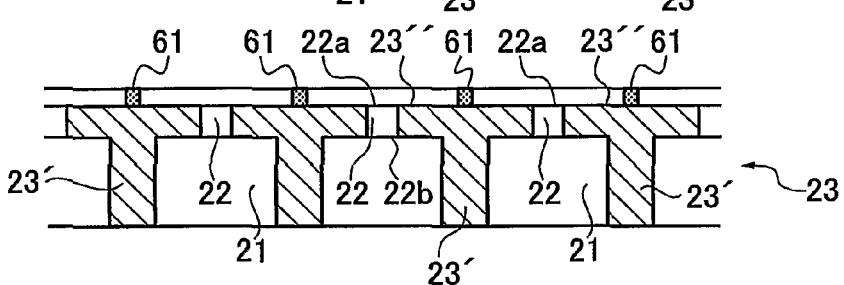
FIG. 20D is a cross-sectional explanatory view illustrating the method of producing the hollow structure forming substrate according to the fourth embodiment of the present invention, in which the hollow structure forming substrate, wherein the dry film resist is removed to form the titanium oxide films having a hexagonal close-packed structure, is illustrated.

Next, as illustrated in FIG. 20D, the dry film resists 57' are removed, and then the hollow structure forming substrate 23, in which the titanium oxide films 61 structuring hexagonal annular contour parts are formed, is fabricated. Note that a hydrophilic property of the titanium oxide film is larger than that of the nickel.

Thereafter, the surface 23" of the hollow structure forming substrate 23 is subjected to a hydrophobic treatment. In the present embodiment, "Optool DSX", available from Daikin Industries, Ltd., is used for the hydrophobic treatment, although it is not limited thereto.

Figure 20E:
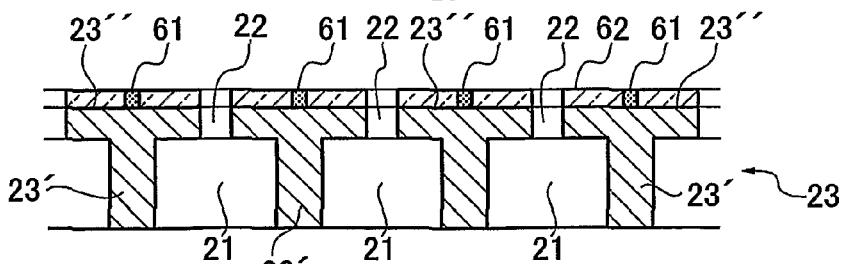
FIG. 20E is a cross-sectional explanatory view illustrating the method of producing the hollow structure forming substrate according to the fourth embodiment of the present invention, in which a state that a water-repellent film is formed on a surface of the hollow structure forming substrate is illustrated.
Figure 20F:
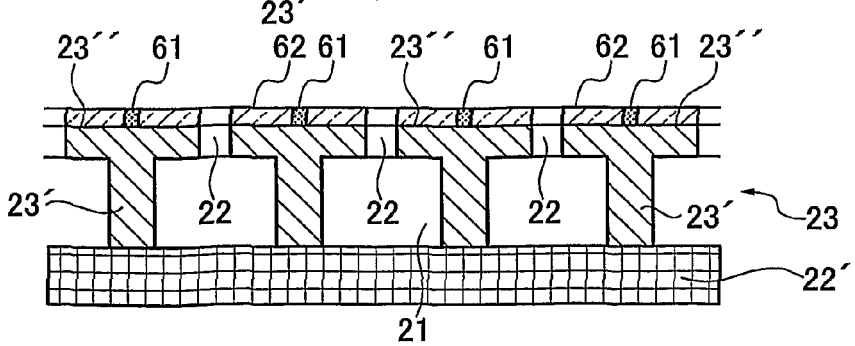
FIG. 20F is a cross-sectional explanatory view illustrating the method of producing the hollow structure forming substrate according to the fourth embodiment of the present invention, in which a state that an adhesive sheet is attached to a back surface of the hollow structure forming substrate is illustrated.

More specifically, in the present embodiment, a dilute solution containing 0.5% of the Optool DSX, to which hydrofluoroether of "Novec (Registered Trademark) HFE7200" available from 3M Company is added, is prepared. As illustrated in FIG. 20E, the dilute solution is coated on the surface 23" including the titanium oxide films 61 of the hollow structure forming substrate 23, which is then dried naturally to form a water-repellent film 62. Then, ultraviolet rays are irradiated on the water-repellent film 62 of the hollow structure forming substrate 23.

The titanium oxide films 61 are activated by the irradiation of the ultraviolet rays, and the water-repellent film 62 covering a surface of the titanium oxide films 61 is decomposed. Although the water-repellent film 62 of a part corresponding to the nickel is also decomposed, a decomposition rate of the water-repellent film 62 for the titanium oxide films 61 is faster. Thus, the irradiation of the ultraviolet rays is stopped at the time point in which the water-repellent film 62 of the titanium oxide films 61 is decomposed and removed.

Thereafter, the water-repellent film 62 is baked onto the hollow structure forming substrate 23 under temperature conditions of, for example, 150 degrees Celsius, so as to enhance adhesion of the water-repellent film 62 and the hollow structure forming substrate 23. Then, as illustrated in FIG. 20E, a back surface of the hollow structure forming substrate 23 is sealed by, for example but not limited to, an adhesive sheet 22'.

Now, a method of forming or producing a hollow structure by using the hollow structure forming substrate 23 according to the present embodiment will be described with reference to FIGS. 22A to 22C.

In the present third embodiment of the invention, the powder of "MC-243", available from Jellice Co., Ltd., is used as the gelatin, and the gelatin and pure water are mixed at a weight ratio of 1:5, to prepare a gelatin solution. Then, the gelatin solution is heated to make temperature of the gelatin solution to 50 degrees Celsius for example, which is then coated on the hollow structure forming substrate 23. The hollow structure forming substrate 23 on which the above gelatin solution is coated is then set in the spin-coater device. In the present embodiment, the hollow structure forming substrate 23 is rotated in the spin-coater device, for example, for 10 seconds with the number of rotations of 1200 rpm, although it is not limited thereto, so as to form the plastic-deformation film 4 including the gelatin as illustrated in FIG. 22A.

Figure 22A:
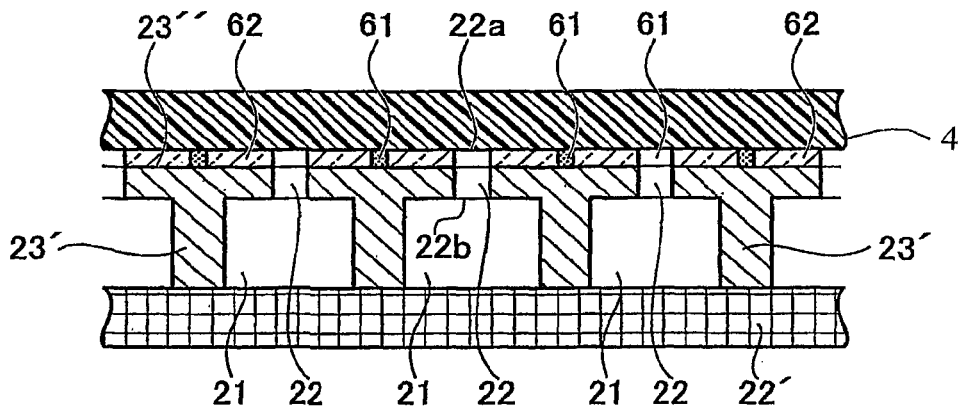
FIG. 22A is a vertical-sectional explanatory view for producing a hollow structure by using the hollow structure forming substrate illustrated in FIG. 20F, in which a state that a plastic-deformation film is formed on the hollow structure forming substrate is illustrated.
Figure 22B:
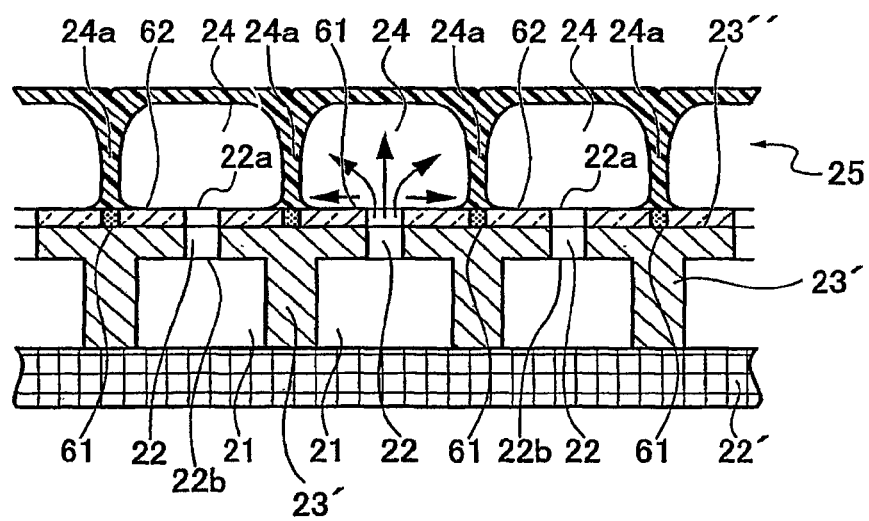
FIG. 22B is a vertical-sectional explanatory view for producing the hollow structure by using the hollow structure forming substrate illustrated in FIG. 20F, in which a process of expansion and extension of the plastic-deformation film illustrated in FIG. 22A is illustrated.
Figure 22C:
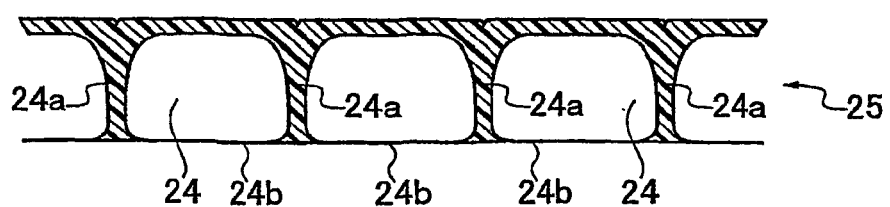
FIG. 22C is a vertical-sectional explanatory view for producing the hollow structure by using the hollow structure forming substrate illustrated in FIG. 20F, in which the hollow structure produced through the process illustrated in FIG. 22B is illustrated.

Then, the hollow structure forming substrate 23, formed with the plastic-deformation film 4 illustrated in FIG. 22A, is set in a vacuum container 125, and internal pressure of the vacuum container 125 is depressurized to about 5 KPa, for example.

Thereby, moisture included in the gelatin is evaporated as the air in quadrangular cylindrical recesses 21 expands. As illustrated in FIG. 22B, when the water-repellent film 62 is formed on the surface, the plastic-deformable material starts to expand vertically from a portion of the titanium oxide film 61, since the plastic-deformable material tries to expand from the hydrophilic titanium oxide film 61 as a starting point and since also the plastic-deformable material is repelled in a portion of the water-repellent film 62. Hence, as illustrated in FIG. 22C, the hollow structure 25 in which the openings 24b of the hollow parts 24 are large is formed. In addition, the plastic-deformation film 4 hardens with an adequate size by the evaporation of the moisture. In the present fourth embodiment, the hollow structure 25, in which a length of a side of the hexagonal hollow part 24 is about 80 µm, in which a depth of the hexagonal hollow part 24 is about 60 µm, and in which a wall-thickness of a partition wall 24a of the hexagonal hollow part 24 (or the cell) is about 5 µm, for example, is obtained.

According to the hollow structure 25 of the present fourth embodiment, the cylindrical openings 22 are arranged in a cubic close-packed manner. Thus, the hollow structure 25 having a honeycomb structure is obtained. Hence, strength of the hollow structure 25 according to the present fourth embodiment is larger than that of the hollow structure 25 according to the first embodiment.

Accordingly, it is possible to achieve the following (1) to (15) from the above-described exemplary embodiments of the present invention.

(1) A hollow structure forming substrate, comprising:
a surface on which a plastic-deformation film is formed by using a plastic-deformable material;
a plurality of regularly-arranged gas-retaining spaces each retaining gas therein;
a plurality of gas leading-out parts each having a first opening which faces corresponding one of the gas-retaining spaces and a second opening which faces the surface, the gas leading-out parts leading out the gas retained in the gas-retaining spaces toward the surface under depressurized environmental condition; and
a plurality of infiltration preventing spaces each provided in a space between corresponding one of the first openings and corresponding one of the second openings, the infiltration preventing spaces preventing infiltration of the plastic-deformable material from the surface into the gas-retaining spaces,
wherein the plastic-deformation film is deformed and expanded on the surface by expanding pressure of the gas led-out from the gas-retaining spaces to the gas leading-out parts through the infiltration preventing spaces so as to form a hollow structure having regularly-arranged hollow parts.

(2) A hollow structure forming substrate according to (1), wherein each of the gas leading-out parts includes a cylindrical opening, and wherein each of the gas-retaining spaces includes a cylindrical recess or a quadrangular cylindrical recess.

(3) A hollow structure forming substrate according to (1), wherein each of the gas leading-out parts includes a cylindrical opening, and wherein each of the gas-retaining spaces includes a hexagonal cylindrical recess.

(4) A hollow structure forming substrate according to (3), wherein the gas-retaining spaces forms a hexagonal close-packed structure.

(5) A hollow structure forming substrate according to (3), wherein the surface includes hexagonal annular contour parts having the cylindrical openings in the center thereof, respectively.

(6) A hollow structure forming substrate according to (5), wherein each of the annular contour parts includes an annular projection.

(7) A hollow structure forming substrate according to (5), wherein the surface surrounded by each of the annular contour parts is processed with a water-repellent process, and wherein each of the annular contour parts has a hydrophilic property.

(8) A hollow structure forming substrate according to (7), wherein each of the annular contour parts includes a titanium metal film.

(9) A hollow structure forming substrate according to (2) or (3), wherein a diameter of each of the cylindrical openings is between 5 µm and 90 µm, preferably between 5 µm and 50 µm, and most preferably between 5 µm and 30 µm.

(10) A hollow structure forming substrate according to (9), wherein each of the gas leading-out parts has volume which is possible to ignore volume of each of the gas-retaining spaces.

(11) A hollow structure forming substrate according to (3), further comprising:
a plurality of recesses each having a circular-arc configuration in cross-section, and each including corresponding one of the cylindrical openings in a central bottom part thereof; and
a plurality of partition walls partitioning each of the adjoining circular-arc recesses, and each having a hexagonal configuration.

According to any one of (1) to (11), it is possible to increase the strength of the opening peripheral wall part, which structures the opening that leads out gas stored in the gas-retaining space, toward outside of the gas-retaining space, and to uniformize the volume of respective hollow parts and uniformize the film-thickness of the parts partitioning the respective hollow parts of the hollow structure.

Particularly, according to any one of (6) to (8), it is possible to produce the hollow structure having the hollow parts, in which each of the hollow parts includes the diameter larger than the opening diameter of the gas leading-out part, even when the opening diameter of the gas leading-out part is small.

(12) A method of producing a hollow structure forming substrate, the method comprising:
forming a resist thin-film on one surface of a metal substrate;
forming cylindrical exposed portions, which correspond to cylindrical openings, by exposing the resist thin-film according to a regular pattern and by removing unexposed portions of the resist thin-film from the one surface;
forming a metal thin-film having regularly-arranged cylindrical recesses, which correspond to the cylindrical openings, and on which a plastic-deformation film is formed, by forming a metal thin-film on the one surface, in which the cylindrical exposed portions are used as a mask, and by removing the cylindrical exposed portions;
forming a resist thick-film on one surface of the metal thin-film in such a manner as to bury the cylindrical recesses;
forming polygonal cylindrical exposed portions by exposing the resist thick-film according to a regular pattern and by removing unexposed portions of the resist-thick film from the one surface of the metal thin-film, wherein the unexposed portions of the resist-thick film correspond to partition wall forming recesses for forming partition walls of regularly-arranged gas-retaining spaces, and wherein the gas-retaining spaces having the cylindrical openings in the center thereof, respectively;

forming a metal thick-film in the partition wall forming recesses, in such a manner that the metal thick-film is integrated with the metal thin-film and that the polygonal cylindrical exposed portions are not buried thereby;

detaching a structure, which includes the metal thin-film, the metal thick-film and the polygonal cylindrical exposed portions, from the metal substrate; and forming the hollow structure forming substrate by removing the polygonal cylindrical exposed portions, wherein the hollow structure forming substrate includes a surface on which the plastic-deformation film is formed, the regularly-arranged gas-retaining spaces each retaining gas therein, and a plurality of gas leading-out parts each having a first opening which faces corresponding one of the gas-retaining spaces and a second opening which faces the surface, and the gas leading-out parts lead out the gas retained in the gas-retaining spaces toward the surface under depressurized environmental condition.

(13) A method of producing the hollow structure forming substrate according to (12), further comprising:

forming hexagonal annular grooves on the one surface of the metal substrate before the resist thin-film is formed on the one surface of the metal substrate, wherein the hexagonal annular grooves form regularly-arranged hexagonal annular projections having the cylindrical openings in the center thereof, respectively.

(14) A method of producing the hollow structure forming substrate according to (12), further comprising:

forming a hydrophilic titanium film on the surface; and forming a water-repellent film on the surface excluding the hydrophilic titanium film.

According to any one of (12) to (14), it is possible to produce the hollow structure forming substrate, which is possible to increase the strength of the opening peripheral wall part, which structures the opening that leads out gas stored in the gas-retaining space, toward outside of the gas-retaining space, and to uniformize the volume of respective hollow parts and uniformize the film-thickness of the parts partitioning the respective hollow parts of the hollow structure.

(15) A method of producing a hollow structure, the method comprising:

forming the plastic-deformation film by coating the plastic-deformable material on the surface of the hollow structure forming substrate according to any one of (1) to (11);

setting the hollow structure forming substrate, on which the plastic-deformation film is formed, under the depressurized environmental condition; and forming the hollow structure having regularly-arranged hollow parts by expanding the gas retained in each of the gas retaining spaces so as to deform and expand the plastic-deformation film with expanding pressure of the gas.

According to (15), since the plastic-deformation film is expanded and extended by the expanding pressure of the gas under the depressurized environmental condition, it is possible to produce the hollow structure in which the film thickness and the volume of the hollow parts are uniform.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based the language employed in the claims and not limited to examples described in the present description or during the prosecution of the application, which examples are to be construed as non-exclusive. For example, in the present disclosure, the term "preferably", "preferred" or the like is non-exclusive and means "preferably", but not limited to.

The present application is based on and claims priority from Japanese Patent Application Serial Number 2007-017716, filed Jan. 29, 2007, the disclosure of which is hereby incorporated by reference herein in its entirety.

The invention claimed is:

1. A hollow structure forming substrate, comprising:
a surface on which a plastic-deformation film is formed by using a plastic-deformable material;
a plurality of regularly-arranged gas-retaining spaces each retaining gas therein;
a plurality of gas leading-out parts each having a first opening which faces a corresponding one of the gas-retaining spaces and a second opening which faces the surface, the gas leading-out parts leading out the gas retained in the gas-retaining spaces toward the surface under a depressurized environmental condition; and
a plurality of infiltration preventing spaces each provided in a space between a corresponding one of the first openings and a corresponding one of the second openings, the infiltration preventing spaces preventing infiltration of the plastic-deformable material from the surface into the gas-retaining spaces,
wherein the plastic-deformation film is deformed and expanded on the surface by expanding pressure of the gas led-out from the gas-retaining spaces to the gas leading-out parts through the infiltration preventing spaces so as to form a hollow structure having regularly-arranged hollow parts,
wherein each of the gas retaining spaces has a volume larger than that of each of the infiltration preventing spaces.

2. A hollow structure forming substrate according to claim 1, wherein each of the gas leading-out parts includes a cylindrical opening, and wherein each of the gas-retaining spaces includes a cylindrical recess or a quadrangular cylindrical recess.

3. A hollow structure forming substrate according to claim 1, wherein each of the gas leading-out parts includes a cylindrical opening, and wherein each of the gas-retaining spaces includes a hexagonal cylindrical recess.

4. A hollow structure forming substrate according to claim 3, wherein the gas-retaining spaces forms a hexagonal close-packed structure.

5. A hollow structure forming substrate according to claim 3, wherein the surface includes hexagonal annular contour parts having the cylindrical openings in the center thereof, respectively.

6. A hollow structure forming substrate according to claim 5, wherein each of the annular contour parts includes an annular projection.

7. A hollow structure forming substrate according to claim 5, wherein the surface surrounded by each of the annular contour parts is processed with a water-repellent process, and wherein each of the annular contour parts has a hydrophilic property.

8. A hollow structure forming substrate according to claim 7, wherein each of the annular contour parts includes a titanium metal film.

9. A hollow structure forming substrate according to claim 2, wherein a diameter of each of the cylindrical openings is between 5 μm and 90 μm.

10. A hollow structure forming substrate according to claim 9, wherein each of the gas leading-out parts has volume which is possible to ignore volume of each of the gas-retaining spaces.

11. A hollow structure forming substrate according to claim 3, further comprising:
a plurality of recesses each having a circular-arc configuration in cross-section, and each including a corresponding one of the cylindrical openings in a central bottom part thereof; and
a plurality of partition walls partitioning each of the adjoining circular-arc recesses, and each having a hexagonal configuration.

12. A hollow structure forming substrate according to claim 3, wherein a diameter of each of the cylindrical openings is between 5 μm and 90 μm.

13. A hollow structure forming substrate according to claim 12, wherein each of the gas leading-out parts has volume which is possible to ignore volume of each of the gas-retaining spaces.

* * * * *